United States Patent
Kim et al.

(10) Patent No.: US 11,442,572 B2
(45) Date of Patent: Sep. 13, 2022

(54) TOUCH DISPLAY CONTROLLER AND TOUCH DISPLAY SYSTEM INCLUDING THE SAME

(71) Applicant: SAMSUNG ELECTRONICS CO., LTD., Suwon-si (KR)

(72) Inventors: Jinbong Kim, Yongin-si (KR); Changju Lee, Suwon-si (KR); Yoonkyung Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 16/938,261

(22) Filed: Jul. 24, 2020

(65) Prior Publication Data

US 2021/0117035 A1   Apr. 22, 2021

(30) Foreign Application Priority Data

Oct. 17, 2019  (KR) .................. 10-2019-0128981
Mar. 16, 2020  (KR) .................. 10-2020-0031897

(51) Int. Cl.
   *G06F 3/044*       (2006.01)
   *G06F 3/04883*     (2022.01)
   (Continued)

(52) U.S. Cl.
   CPC ............ *G06F 3/0416* (2013.01); *G06F 3/044* (2013.01); *G06F 3/0412* (2013.01);
   (Continued)

(58) Field of Classification Search
   CPC ...... G06F 3/0416; G06F 3/0412; G06F 3/044; G06F 3/04883; G06F 2203/04111;
   (Continued)

(56) References Cited

U.S. PATENT DOCUMENTS 8,314,779 B2   11/2012   Chan et al.
9,975,033 B2    5/2018   Tran et al.
(Continued)

FOREIGN PATENT DOCUMENTS

WO   2011095954   8/2011

OTHER PUBLICATIONS

Kim et al., "A mobile-display-driver IC embedding a capacitive-touch-screen controller system," 2010 IEEE International Solid-State Circuits Conference—(ISSCC), 2010, pp. 114-115, doi: 10.1109/ISSCC.2010.5434080. (Year: 2010).*

*Primary Examiner* — Julie Anne Watko
(74) *Attorney, Agent, or Firm* — F. Chau & Associates, LLC

(57) ABSTRACT

A touch display controller, panel and system may include a select circuit having a first selectable input terminal connected to touch sensors, a second selectable input terminal connected to display pixels, and an output terminal; an analog front-end circuit coupled to the output terminal of the select circuit to receive a raw analog signal, and having a shared processing path for analog signals from both the touch sensors and the display pixels; and a control circuit configured to control the an analog front-end circuit based on which type of element among the touch sensors or the display pixels is connected to the analog front-end circuit.

17 Claims, 19 Drawing Sheets

(51) Int. Cl.
*G09G 3/3233* (2016.01)
*G06V 40/13* (2022.01)
*G06F 3/041* (2006.01)

(52) U.S. Cl.
CPC ...... *G06F 3/04883* (2013.01); *G06V 40/1306* (2022.01); *G09G 3/3233* (2013.01); *G09G 2300/0842* (2013.01); *G09G 2310/0297* (2013.01); *G09G 2320/0233* (2013.01); *G09G 2320/0295* (2013.01); *G09G 2320/045* (2013.01)

(58) Field of Classification Search
CPC ............. G06V 40/1306; G09G 3/3225; G09G 3/3233; G09G 230/0426; G09G 2300/0842; G09G 2300/0861; G09G 2310/0297; G09G 2320/0233; G09G 2320/0295; G09G 2320/043; G09G 2320/045
See application file for complete search history.

(56) References Cited

U.S. PATENT DOCUMENTS

| | | | |
|---|---|---|---|
| 11,307,704 B1* | 4/2022 | Pelissier | G06F 3/04883 |
| 2011/0191042 A1 | 8/2011 | Chaji et al. | |
| 2014/0015824 A1 | 1/2014 | Chaji et al. | |
| 2014/0159609 A1 | 6/2014 | Xie | |
| 2015/0077314 A1 | 3/2015 | Kim et al. | |
| 2015/0371586 A1 | 12/2015 | Chen et al. | |
| 2015/0371587 A1 | 12/2015 | Chen et al. | |
| 2016/0117988 A1 | 4/2016 | Lee | |
| 2016/0246396 A1 | 8/2016 | Dickinson et al. | |
| 2016/0314742 A1 | 10/2016 | Zhou | |
| 2017/0177920 A1 | 6/2017 | Kremin et al. | |
| 2017/0330505 A1 | 11/2017 | Han | |
| 2017/0330506 A1 | 11/2017 | Wu | |
| 2017/0365215 A1 | 12/2017 | He et al. | |
| 2017/0372663 A1 | 12/2017 | Wu | |
| 2018/0040275 A1 | 2/2018 | Wu | |
| 2018/0040277 A1 | 2/2018 | Cai et al. | |
| 2018/0047333 A1 | 2/2018 | Nie | |
| 2018/0082627 A1 | 3/2018 | Deng | |
| 2018/0102091 A1 | 4/2018 | Deng | |
| 2018/0114487 A1 | 4/2018 | He et al. | |
| 2018/0164943 A1* | 6/2018 | Hung | G06F 3/04166 |
| 2018/0301085 A1 | 10/2018 | Han | |
| 2018/0357951 A1 | 12/2018 | Deng | |
| 2019/0005876 A1 | 1/2019 | Liu | |
| 2019/0102006 A1 | 4/2019 | Suzuki et al. | |
| 2019/0213374 A1 | 7/2019 | Kwon et al. | |
| 2019/0270305 A1 | 9/2019 | Hao et al. | |
| 2021/0072859 A1* | 3/2021 | Liang | G06F 3/04166 |

* cited by examiner

TOUCH DISPLAY CONTROLLER AND TOUCH DISPLAY SYSTEM INCLUDING THE SAME

CROSS-REFERENCE

This application claims priority under 35 U.S.C. § 119 to Korean Patent Application Numbers 10-2020-0031897 filed on Mar. 16, 2020 and 10-2019-0128981 filed on Oct. 17, 2019 in the Korean Intellectual Property Office, the disclosures of which are incorporated by reference in their entireties.

TECHNICAL FIELD

The present disclosure relates generally to touch-sensing display systems, and more particularly to a touch display controller and a touch display system including the same.

DISCUSSION OF RELATED ART

A touch sensor device recognizes a location in which a touch input has occurred, a gesture depending on the touch input, and the like, in response to the touch input. The touch sensor device may be integrated with a display device, and may include a touch sensor panel outputting a signal in response to a touch input, and a touch controller processing the touch input. The touch controller may be implemented as a semiconductor chip independent of a display driver driving a display panel. Accordingly, a touch display system including a touch sensor device and a display device may include two or more semiconductor chips.

SUMMARY

Exemplary embodiments provide a touch display driver and a touch display system including the same, capable of implementing a touch controller, a display driver, and a pixel compensation circuit as a single semiconductor chip while simplifying a system configuration and reducing a circuit area by designing a pixel compensation circuit for pixels of a display panel and a touch controller such that they share an analog circuit.

According to an exemplary embodiment, a touch display controller includes a select circuit having a first selectable input terminal for touch sensors, a second selectable input terminal for display pixels; and an output terminal; and an analog front-end circuit coupled to the output terminal of the select circuit to receive a raw analog signal, and having a shared processing path for analog signals from both the touch sensors and the display pixels.

According to an exemplary embodiment, a touch display controller includes an analog front-end circuit configured to process raw signal output by at least one of touch sensors included in a touch sensor panel or pixels included in a display panel and to generate an analog signal, an analog-to-digital converter configured to convert the analog signal into a digital signal, and a select circuit connected between the touch sensors and the pixels and the front-end circuit and configured to select one of the touch sensors or the pixels and to electrically connect the one of the touch sensors or the pixels to the analog front-end circuit.

According to an exemplary embodiment, a touch display system includes a cover window including a front surface receiving a touch input, a touch sensor panel disposed below the cover window and including touch sensors in which a touch sensing signal is generated in response to the touch input, a display panel disposed below the cover window and including pixels, a wiring area including touch routing connections connected to the touch sensors and pixel routing connections connected to the pixels, the touch routing connections and the pixel routing connections being disposed on a single layer, and a touch display controller connected to the touch sensor panel and the display panel through the wiring area and configured to determine the touch input and to display an image on the display panel. The touch display controller includes an analog front-end circuit to process a signal output by the touch sensors and the pixels, and the analog front-end circuit is selectably connected to the touch routing connections or the pixel routing connections.

According to an exemplary embodiment, a touch display panel includes a select circuit configured to alternately select touch sensors and display pixels included in the touch display panel, an analog front-end circuit alternately connected to the touch sensors or the pixels by the select circuit, and configured to generate an analog signal using an output signal from the touch sensors or the pixels, and a control circuit configured to set a signal amplification gain of the analog front-end circuit to a first value when the touch sensors are connected to the analog front-end circuit, and to set the signal amplification gain of the analog front-end circuit to a second value, different from the first value, when the pixels are connected to the analog front-end circuit.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary embodiments will be described with reference to the accompanying drawings.

Figure 1:
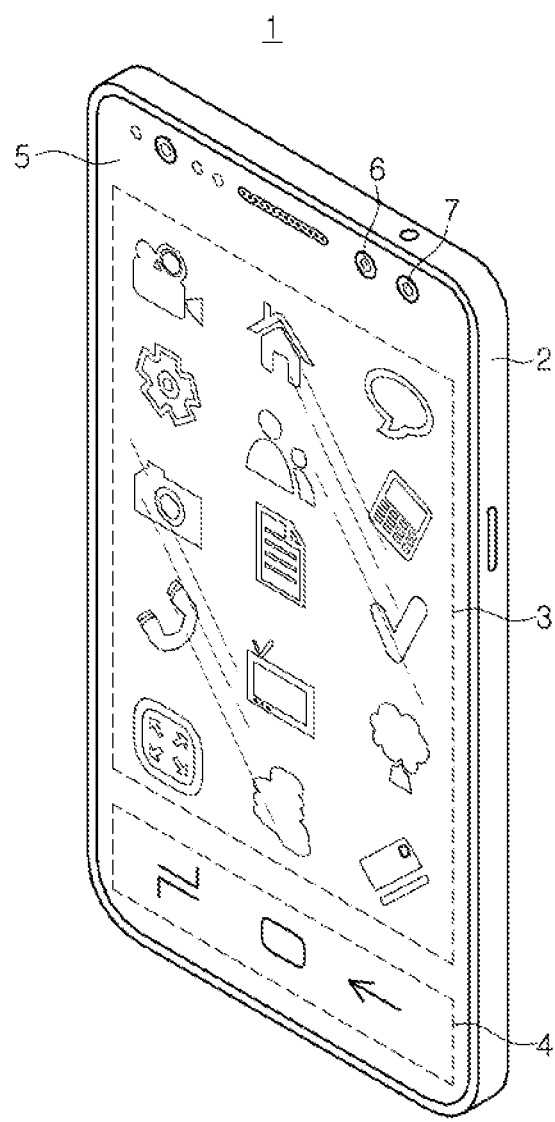
FIG. 1 is a perspective view diagram of an electronic device including a touch display system according to an exemplary embodiment.

FIG. 1 illustrates a perspective view of an electronic device including a touch display system according to an exemplary embodiment.

Referring to FIG. 1, an electronic device 1 including a touch display system according to an exemplary embodiment may be a mobile device such as a smartphone. However, the touch display system according to an exemplary embodiment may be widely applied to not only mobile devices but also home appliances such as television sets, refrigerators, washing machines, computer devices such as desktop computers and laptop computers, vehicles, and the like.

The electronic device 1 may include a housing 2, a touch display system 5, a camera 6, and the like. In an exemplary embodiment, the touch display system 5 may substantially cover the entire front surface of the housing 2 and may differently operate in a first area 3, a second area 4, or the like, based on an operating mode of the electronic device 1 or an application being executed. The camera 6 may be coupled to a light source 7 to provide a facial recognition function, or the like.

In an exemplary embodiment, the touch display system 5 may include a display device displaying an image, a touch sensor device sensing a touch input, or the like. Also, the touch display system 5 may include a touch display controller displaying an image and determining coordinates, a gesture, or the like, of the touch input. The touch display controller may drive a display panel, included in the display device, and may determine coordinates and a gesture of the touch input applied to the touch sensor panel included in the touch sensor device.

As an example, the touch display controller may be implemented as a single semiconductor package. The touch display controller may be equipped with a display driver and a touch controller. The touch controller may include a fingerprint analyzer. A pixel compensation circuit, connected to a display panel to compensate for a change in characteristics of pixels, may be included in the touch display controller. In an exemplary embodiment, the pixel compensation circuit and the touch controller may share at least a portion of analog circuits. An analog circuit, shared by the pixel compensation circuit and the touch controller, may include a charge amplifier, a filter, a variable gain amplifier, a sampler, an integrator, and the like. According to an exemplary embodiment, an analog-to-digital converter converting an analog signal into a digital signal and a processor processing the digital signal may also be shared by the pixel compensation circuit and the touch controller.

In an exemplary embodiment, a fingerprint sensor array may be implemented and may be integrated with the touch sensor panel. When the fingerprint sensor array is integrated with the touch sensor panel, a fingerprint controller, recognizing a fingerprint input by processing a signal output by the fingerprint sensor array, may be included in the touch display controller. In an example, the fingerprint controller may share at least a portion of the pixel compensation circuit, the touch controller, and the analog circuit.

Figure 2:
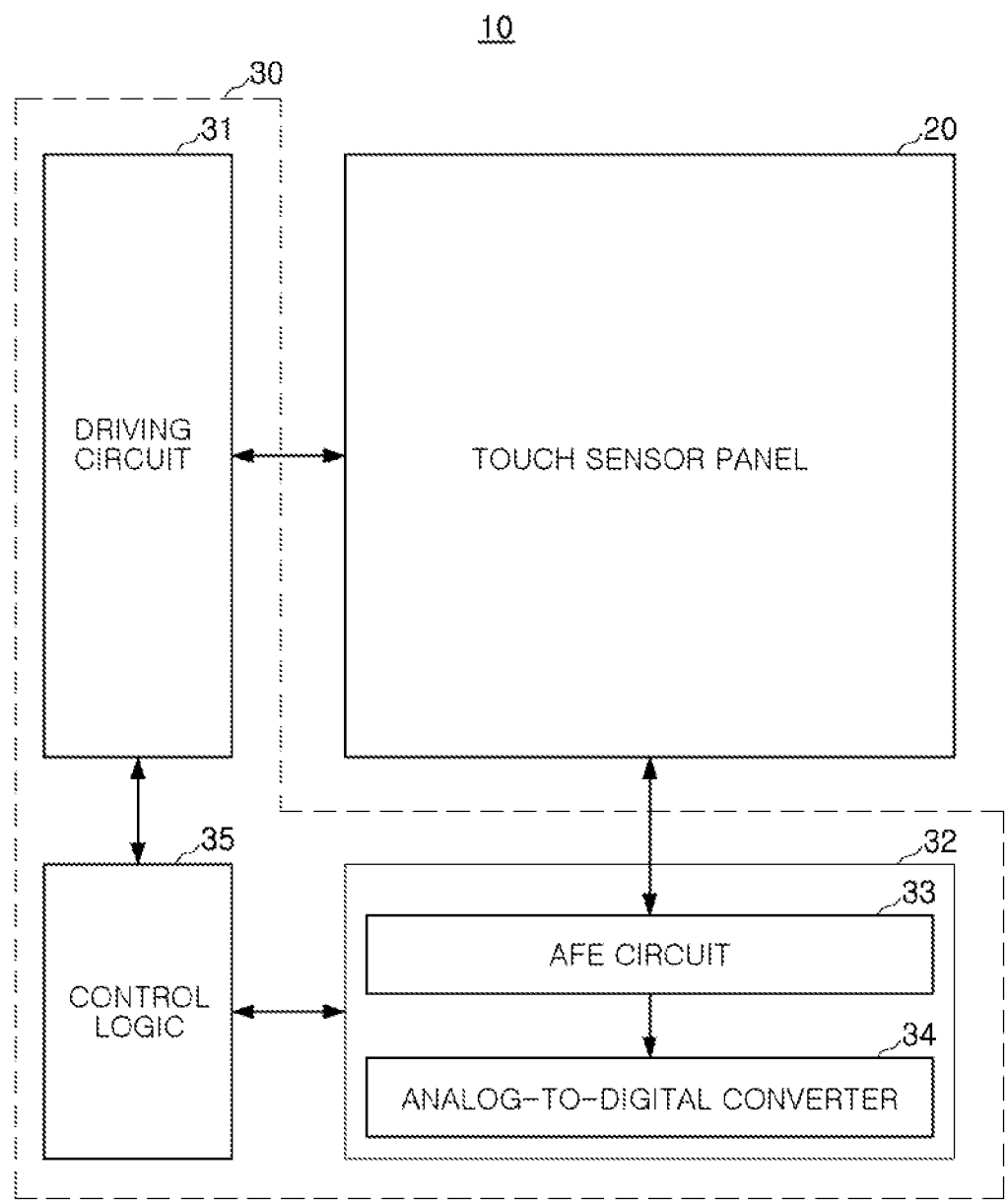
FIG. 2 is a schematic block diagram of a touch sensor device according to an exemplary embodiment.

FIG. 2 illustrates a touch sensor device according to an exemplary embodiment.

Referring to FIG. 2, a touch sensor device 10 according to an exemplary embodiment may include a touch sensor panel 20 and the touch controller 30. The touch controller 30 may include a driving circuit 31, a sensing circuit 32, control logic 35, and the like. The driving circuit 31 may input a driving signal to a driving electrode included in the touch sensor panel 20. The driving signal may be a clock signal having a predetermined frequency, a duty ratio, or the like.

The sensing circuit 32 may detect a change in capacitance occurring in the touch sensor panel 20 in response to the touch input. For example, mutual capacitance may be generated between a driving electrode, receiving the driving signal from the driving circuit 31, and a sensing electrode. A change in mutual capacitance may be caused by the touch input. The sensing circuit 32 may detect the change in mutual capacitance to generate a sensing voltage.

In an alternate embodiment, the sensing circuit 32 may detect a change in self-capacitance, rather than the mutual capacitance, to generate a sensing voltage. When the sensing circuit 32 detects the change in self-capacitance, a driving signal such as a clock signal need not be input to the touch sensor panel 20, and the driving to electrode and the sensing electrode need not be distinguished from each other in the touch sensor panel 20.

The sensing circuit 32 may compare the sensing voltage with a predetermined reference voltage, and the control logic 35 may determine at least one of whether the touch input occurs, coordinates of the touch input, and a gesture, based on a comparison result of the sensed voltage and the reference voltage.

The sensing circuit 32 may include an analog front-end (AFE) circuit 33 generating an analog signal based on the change in capacitance, an analog-to-digital converter 34 converting an analog signal into a digital signal, or the like. In an exemplary embodiment, the analog front-end circuit 33 may include at least a portion of a charge amplifier converting the change in capacitance into a voltage signal, a filter, a variable gain amplifier, a sampler, and an integrator.

The digital signal, output by the analog-to-digital converter 34, may be transmitted to the control logic 35. The control logic 35 may output a digital signal to an external processor through an input/output interface circuit, and the external processor may process the digital signal to determine coordinates, a gesture, or the like, of the touch input.

In an exemplary embodiment, a processor may be included in the control logic 35. In this case, the processor in the control logic 35 may process the digital signal output from the analog-to-digital converter 34 to determine the coordinates, the gesture, or the like, of the touch input.

The touch sensor panel 20 may include a plurality of touch sensors. The touch sensors may be implemented in various forms. As an example, each of the touch sensors may include two or more electrodes.

When the touch controller 30 senses the touch input based on the change in mutual capacitance, each of the touch sensors may include at least one driving electrode and at least one sensing electrode. When the touch controller 30 senses a touch input based on the change in self-capacitance, all electrodes included in each of the touch sensors may operate as sensing electrodes.

Figure 3:
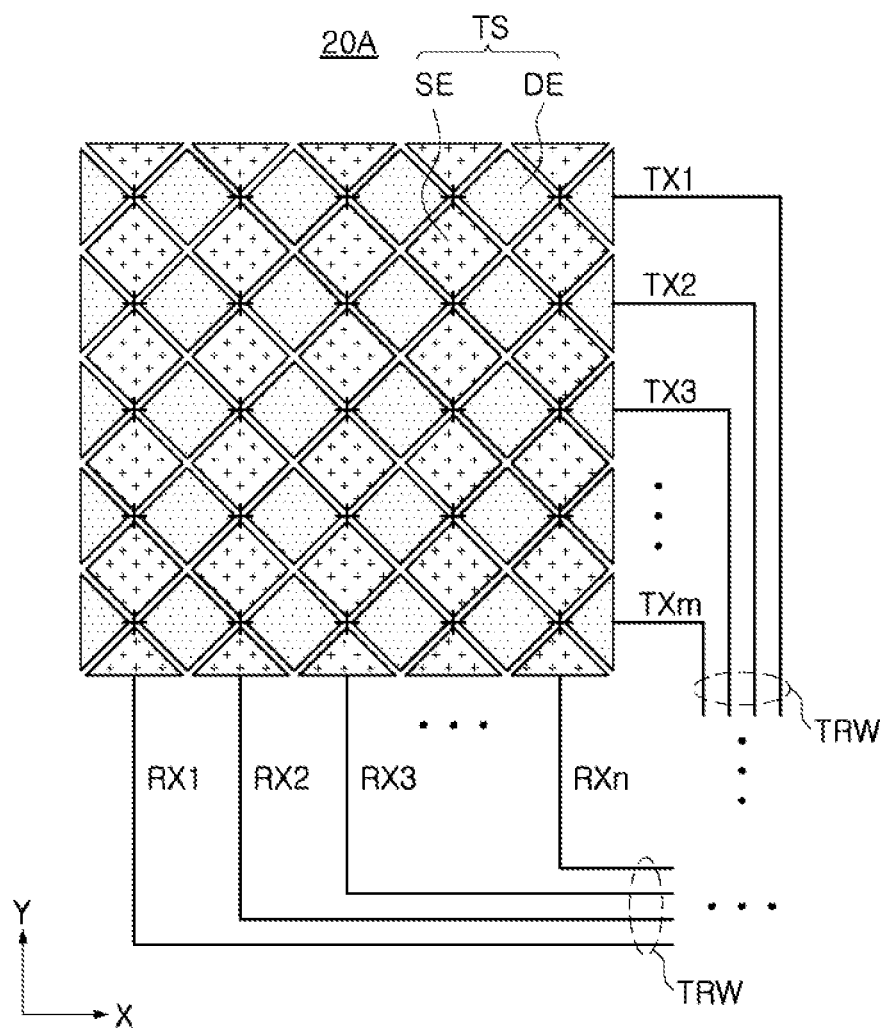
FIG. 3 is a schematic diagram of a touch sensor panel included in a touch sensor device according to an exemplary embodiment.
Figure 4:
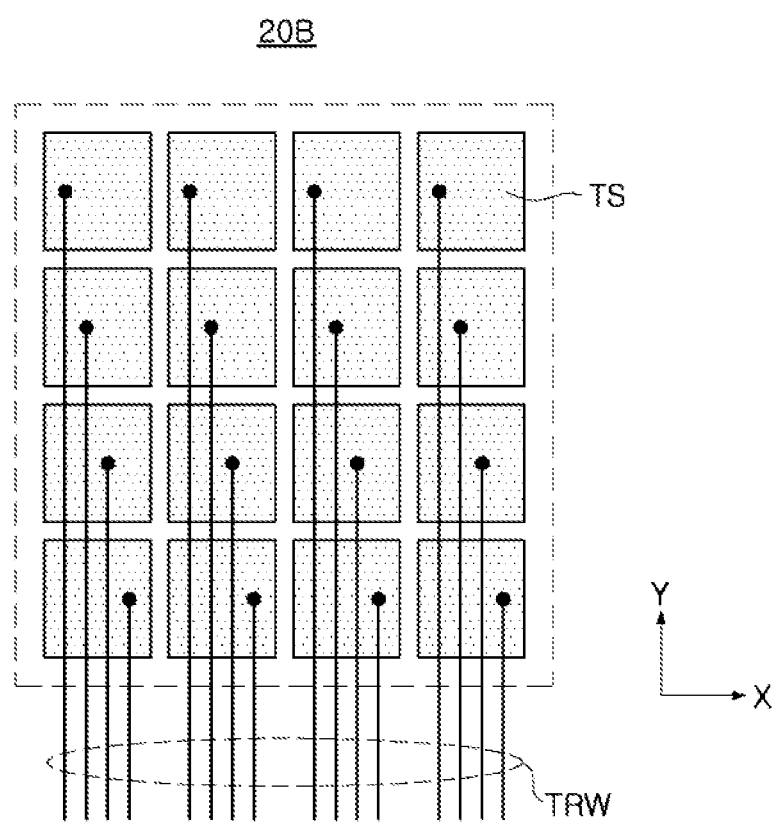
FIG. 4 is a schematic diagram of a touch sensor panel included in a touch sensor device according to an exemplary embodiment.

FIGS. 3 and 4 illustrate touch sensor panels included in a touch sensor device according to an exemplary embodiment.

Referring to FIG. 3, a touch sensor panel 20A according to an exemplary embodiment may include a plurality of driving electrodes DE, extending in a first direction (here, an X-axis direction), and a plurality of sensing electrodes SE extending in a second direction (here, a Y-axis direction) intersecting the first direction. The driving electrodes DE and the sensing electrodes SE may be paired to provide touch sensors TS. In an exemplary embodiment, the driving electrodes DE and the sensing electrodes SE may be disposed on different layers.

The touch sensors TS may be connected to touch routing connections TRW. The touch routing connections TRW may include conductive lines for connecting a touch controller, included in a touch sensor device, to the touch sensors TS.

A portion of the touch routing connections TRW may be connected to the driving electrodes DE to provide driving channels TX1 to TXm, and the other touch routing connections TRW may be connected to the sensing electrodes SE to provide sensing channels RX1 to RXn. The touch controller may input a driving signal to at least one of the driving electrodes DE through the driving channels TX1 TO TXm, and may detect the change in mutual capacitance from the sensing electrodes SE through the sensing channels RX1 to RXn.

Referring to FIG. 4, a touch sensor panel 20B according to according to an exemplary embodiment includes a plurality of touch sensors TS arranged in a first direction (here, an X-axis direction) and a second direction (here, a Y-axis direction) intersecting the first direction. In the exemplary embodiment illustrated in FIG. 4, the touch sensors TS may be disposed on a single layer. The touch sensors TS may be connected to touch routing connections TRW, and a touch controller may detect a change in capacitance occurring in the touch sensors TS through the touch routing connections TRW. For example, the change in capacitance may be a change in self-capacitance.

However, a touch sensor panel according to alternate embodiments may have various structures, unlike the exemplary embodiments illustrated in FIGS. 3 and 4. As an example, a portion of the plurality of touch sensors TS disposed on a single layer may be allocated to driving electrodes receiving a driving signal, and the other touch sensors TS may be allocated to sensing electrodes. The touch controller may input a driving signal to at least one of the driving electrodes and may detect a change in mutual capacitance from adjacent sensing electrodes on to the same layer as the driving electrode to which the driving signal is input. Alternatively, the touch sensors TS may be disposed on different layers to each other, and the touch controller may detect a change in self-capacitance from the touch sensors TS without inputting a driving signal to determine a touch input.

The touch controller may be connected to the touch sensors TS through touch routing connections TRW, and may include an analog front-end circuit detecting a change in capacitance from the touch sensors TS. The analog front-end circuit may include a charge amplifier, a filter, a variable gain amplifier, an integrator, and the like. In addition, the touch controller may include an analog-to-digital converter converting an analog signal, output from the analog front-end circuit, into a digital signal.

Figure 5:
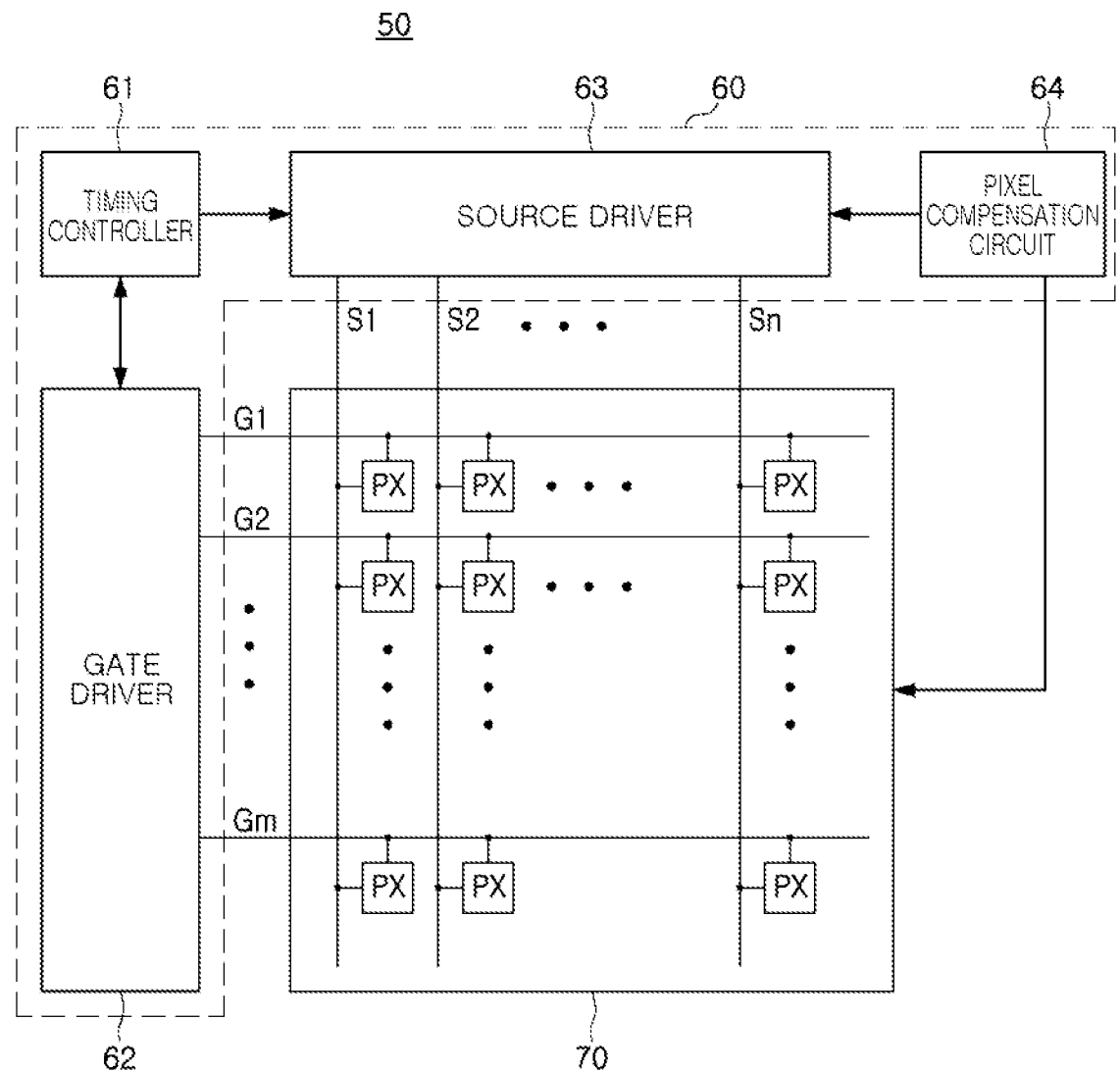
FIG. 5 is a schematic block diagram of a display device according to an exemplary embodiment.

FIG. 5 illustrates a display device according to an exemplary embodiment.

Referring to FIG. 5, a display device 50 may include a display driver 60 and a display panel 70. The display driver 60 may include a timing controller 61, a gate driver 62, a source driver 63, a pixel compensation circuit 64, and the like. The display panel 70 may include a plurality of pixels PX disposed between a plurality of gate lines G1 to Gm and a plurality of source lines S1 to Sn.

In an exemplary embodiment, the display device 50 may display an image in units of frames. Time required to display a single frame may be defined as a vertical period, and the vertical period may be determined by a frame frequency of the display device 50. When a frame frequency of the display device 50 Hz is 60 Hz, the vertical period may be 1/50 second or 1/60 second (about 16.7 msec), respectively. However, the frame frequency of the display device 50 may be variously modified.

During a single vertical period, the gate driver 62 may scan each of the plurality of gate lines G1 to Gm. Time required for the gate driver 62 to scan each of the plurality of gate lines G1 to Gm may be defined as a horizontal period. During a single horizontal period, the source driver 63 outputs grayscale voltages to pixels PX. The grayscale voltages may be output by the source driver 63 based on the image data, and luminance of each of the pixels PX may be determined by the respective grayscale voltages.

The pixel compensation circuit 64 may compensate for a change in characteristics of pixels PX based on an operating condition or use time. As an example, when the display device 50 is an organic light-emitting display device, each of the pixels PX may include at least one switch element, at least one organic light-emitting (OLED) element, and at least one capacitor. As an operating condition, such as temperature, is changed or the use time is increased, characteristics of a threshold voltage, or the like, of at least one of the organic light-emitting element and the switch element may be changed.

The pixel compensation circuit 64 may detect the above and other changes in characteristics of each of the pixels PX and may transmit a result of the detections, in the form of a digital signal, to a processor included in the timing controller 61 or a processor included in an external host, for example. A processor may adjust a voltage or a current input to the pixels PX, based on information transmitted by the pixel compensation circuit 64. Thus, the quality of the screen displayed by the display panel 70 may be improved.

As an example, the pixel compensation circuit 64 may include an analog front-end circuit for detecting a change in characteristics of each of the pixels PX. The analog front-end circuit may generate an analog signal corresponding to the change in characteristics occurring in the pixels PX, such as, for example, a change in a threshold voltage. The pixel compensation circuit 64 may include an analog-to-digital converter converting an analog signal into a digital signal.

In an exemplary embodiment, the touch controller 30 and the display driver 60 described with reference to FIGS. 2 to 5 may be disposed in a single semiconductor chip. Accordingly, a touch display controller for driving the touch sensor panel 20 and the display panel 70 may be implemented as a single semiconductor chip, where power consumption may be reduced and the volume of a system may be reduced. In addition, the touch controller 30 and the pixel compensation circuit 64 mounted in one semiconductor chip may share at least some components. In an exemplary embodiment, the touch controller 30 and the pixel compensation circuit 64 may share an analog front-end circuit and/or an analog-to-digital converter detecting a change in capacitance occurring in the touch sensors TS or a change in characteristics occurring in the pixels PX. As an example, a single processor may determine a touch input from the touch sensors TS and may also adjust a voltage and/or current input to the display pixels PX.

Figure 6:
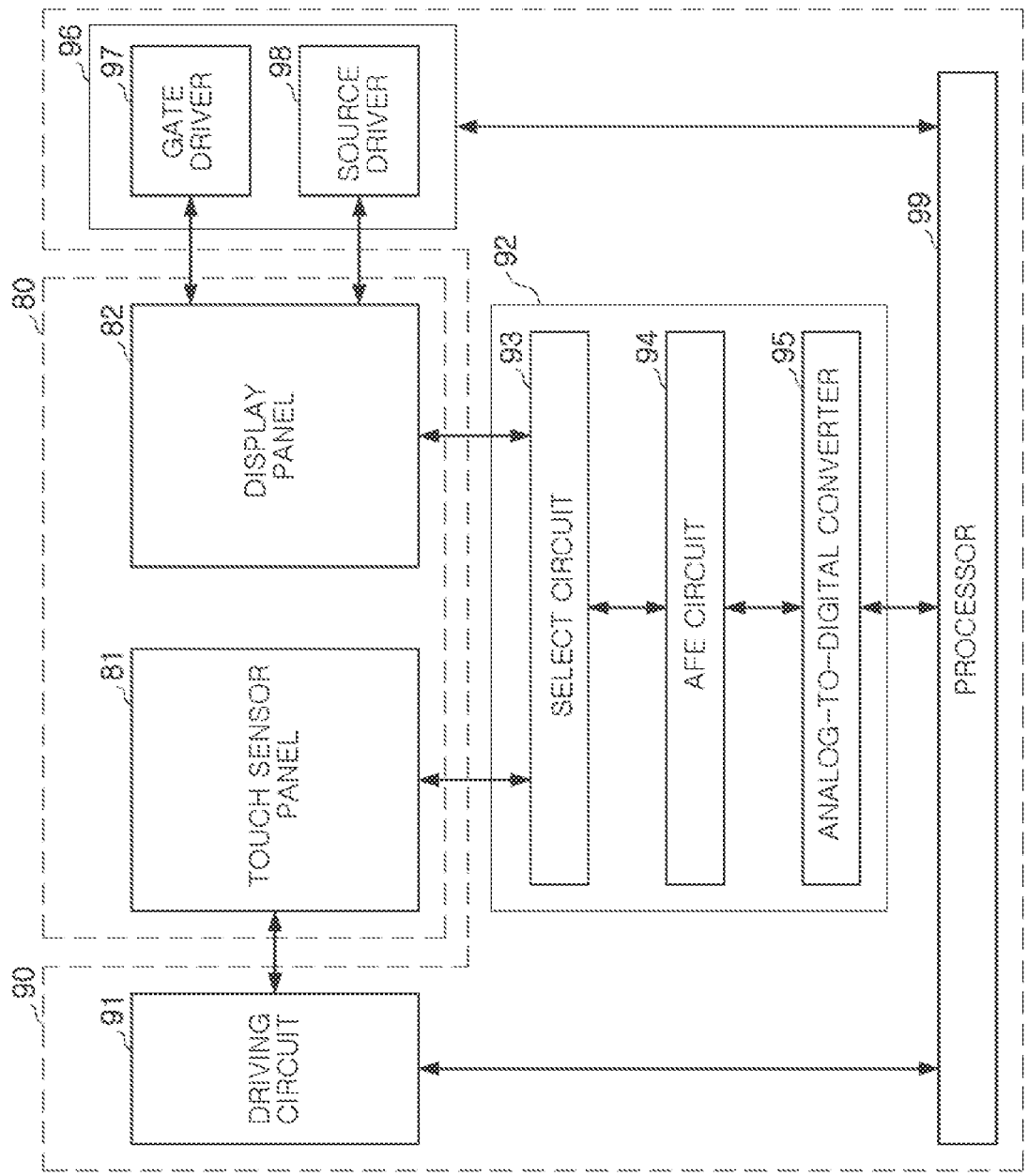
FIG. 6 is a schematic block diagram of a touch display system according to an exemplary embodiment.

FIG. 6 illustrates a touch display system according to an exemplary embodiment.

Referring to FIG. 6, a touch display system according to according to an exemplary embodiment provides a touch sensor device and a display device, and may include a touch display panel 80 and a touch display controller 90. The touch display panel 80 may include a touch sensor panel 81 and a display panel 82. The touch display controller 90 may include a driving circuit 91, a sensing circuit 92, a display driving circuit 96, a processor 99, and the like. The sensing circuit 92 may include a select circuit 93, an analog front-end circuit 94, and an analog-to-digital converter 95. The display driving circuit 96 may include a gate driver 97 and a source driver 98.

In the exemplary embodiment shown in FIG. 6, the touch display controller 90 may include the processor 99, and the processor 99 may execute commands necessary for the operation of the touch display system. As an example, the processor 99 may include a digital signal processing (DSP) block for processing a digital signal, an input/output interface, a memory, and the like. The processor 99 may control the driving circuit 91 and the sensing circuit 92 of the touch sensor device, and may further control the gate driver 97 and the source driver 98, included in the display driving circuit 96, to display an image on the display panel 82. In addition, the processor 99 may be coupled to the sensing circuit 92 to provide a pixel compensation circuit of the display device.

The select circuit 93 may select one of the touch sensors TS included in the touch sensor panel 81 or the display pixels PX included in the display panel 82, and may connect the selected one of touch sensors or display pixels to the analog front-end circuit 85. When the touch sensors are connected to the analog front-end circuit 94 by the select circuit 93, the analog front-end circuit 94 may generate an analog signal in response to a change in capacitance occurring in the touch sensor panel 81. When the analog-to-digital converter 95 converts an analog signal to a digital signal, the processor 99 may determine coordinates, a gesture, and the like, of the touch input using the digital signal.

When the select circuit 93 connects pixels to the analog front-end circuit 94, the analog front-end circuit 94 may generate an analog signal indicating a change in characteristics of elements included in the pixels. When the analog-to-digital converter 95 converts an analog signal to a digital signal, the processor 99 may perform an operation to compensate for the change in characteristics of elements included in pixels using the digital signal. As an example, the processor 99 may control the gate driver 97 and the source driver 98 to adjust a signal output to the pixels.

Figure 7A:
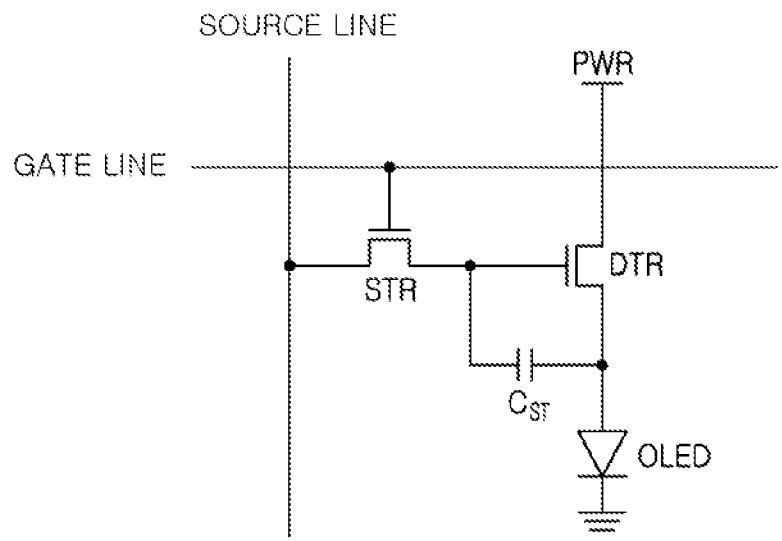
FIG. 7A is a schematic circuit diagram of a pixel included in a display device according to an exemplary embodiment.
Figure 7B:
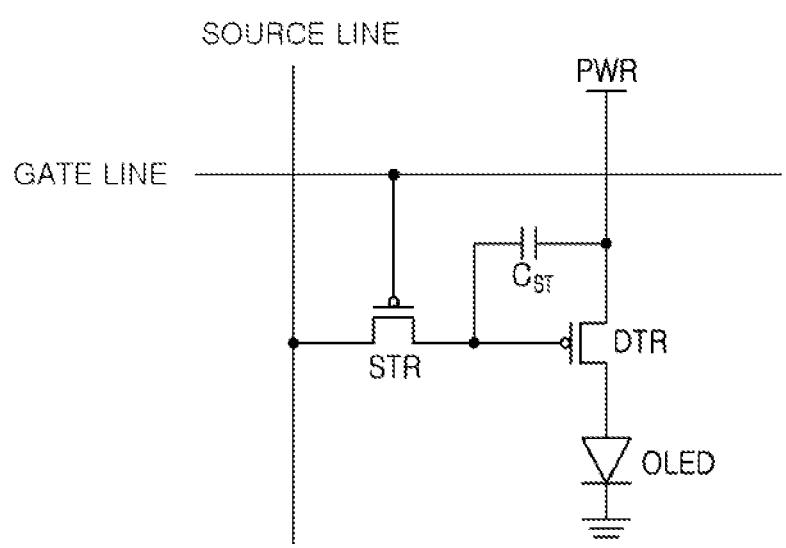
FIG. 7B is a schematic circuit diagram of a pixel included in a display device according to an exemplary embodiment.

FIGS. 7A and 7B illustrate two different examples of a pixel included in a display device according to an exemplary embodiment.

Referring to FIGS. 7A and 7B, a pixel included in a display device includes a light-emitting element (OLED), select transistor elements STR and driving transistor elements DTR for driving the OLED, a storage capacitor CST, and the like. The different pixel structures illustrated in FIGS. 7A and 7B are exemplary, and other elements may be added or the pixel circuit may be changed without departing from the scope of the present disclosure. A pixel, described with reference to FIG. 7A or 7B, may be applied to an organic light-emitting diode (OLED) display device, and a structure of the pixel may be varied based on the criteria of a given display device.

Referring first to FIG. 7A, the elements STR and DTR included in a pixel may be implemented as NMOS transistors. A gate of the select element STR may be connected to a gate line, and a gate of the driving element DTR may be connected to the select element STR, which, in turn, may be connected to a source line. When the select element STR is turned on by a gate signal input to the gate line, a storage capacitor CST may be charged by a source signal input to the source line. Here, the storage capacitor CST may be connected between a gate of the driving element DTR and a node disposed between the output of the driving element DTR and the input of the OLED. Driving current input to the OLED by the driving device DTR may be determined by a voltage of the storage capacitor CST, thereby driving an output luminance of the OLED.

Referring to FIG. 7B, elements STR and DTR included in a pixel may be implemented as PMOS transistors. In an exemplary embodiment illustrated in FIG. 7B, a storage capacitor CST may be connected between a gate of the driving element DTR and a power supply node PWR connected to an input to the driving element DTR. Similar to the exemplary embodiment illustrated in FIG. 7A, when the select element STR is turned on by a gate signal, the storage capacitor CST is charged by a source signal and a driving current may be input to a light-emitting element such as the OLED.

A current, flowing to the OLED, may be affected by the storage capacitor CST, the driving device DTR, and the like. As an example, when a threshold voltage of the driving element DTR is changed by causes such as use time, an ambient temperature, and/or the like, the current flowing to the OLED may be changed even when the same gate signal and the same source signal are input. In an exemplary embodiment, a pixel compensation circuit for compensating for a change in characteristics of the pixel described above may be included in a touch display controller. At least a portion of components included in the pixel compensation circuit may be shared with a sensing circuit connected to a touch sensor panel to reduce power consumption and manufacturing costs of the touch display system and to improve integration density of the touch display system.

Figure 8:
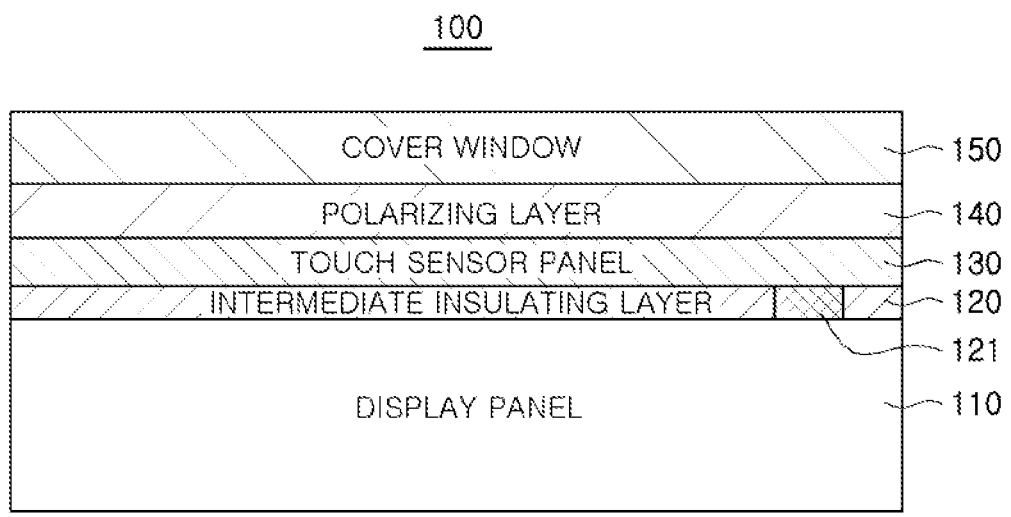
FIG. 8 is a cross-sectional diagram of a touch display system according to an exemplary embodiment.
Figure 9:
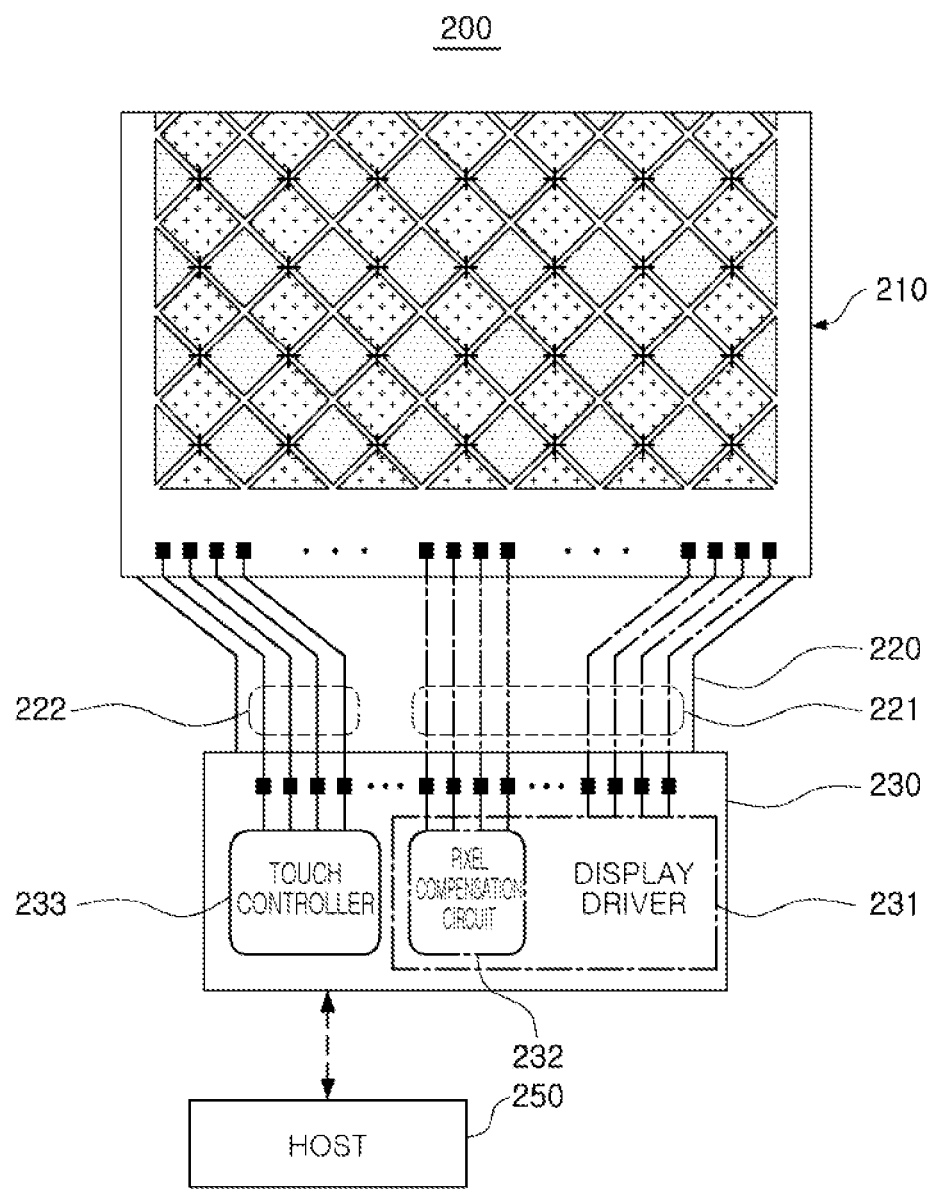
FIG. 9 is a schematic diagram of a touch display system according to an exemplary embodiment.

FIGS. 8 and 9 illustrate a touch display system according to an exemplary embodiment.

Referring to FIG. 8, a touch display system 100 according to an exemplary embodiment may include a display panel 110, an intermediate insulating layer 120, a touch sensor panel 130, a polarizing layer 140, a cover window 150, and the like. The display panel 110 may be an organic light-emitting display panel or a liquid crystal display panel, for example. The intermediate insulating layer 120 may be an encapsulation layer for encapsulating the display panel 110, and may have a thickness of several tens of micrometers. Alternatively, the thickness of the intermediate insulating layer 120 may be reduced to several micrometers.

In an exemplary embodiment illustrated in FIG. 8, the touch sensor panel 130 may be disposed on the intermediate insulating layer 120. The touch sensor panel 130 may include a plurality of touch sensors generating electrical signals in response to a touch input, and the touch sensors may each include a driving electrode and a sensing electrode. The touch sensor panel 130 may operate in a mutual capacitance manner, or in a self-capacitance manner.

The polarizing layer 140 may be disposed above the touch sensor panel 130 and may be provided such that various components, like those formed on the touch sensor panel 130 or the display panel 110, such as touch sensors, a black matrix, and the like, are less visible to a user. Also, the polarizing layer 140 may be included in the touch display system 100 for the purpose of improving visibility of a panel in a place in which external light is relatively bright. A cover window 150 may be an outermost layer directly exposed to an external environment and may be formed of a tempered glass, acryl, or the like. The cover window 150 may receive the touch input on a front surface thereof.

Referring to FIG. 8, the intermediate insulating layer 120 may include a via region 121. The via region 121 may be a region in which a plurality of vias are formed to penetrate through the intermediate insulating layer 120. As a thickness of an electronic device including the touch display system 100 is decreased, a thickness of the intermediate insulating layer 120 may also be decreased, such as to 10 μm or less. Thus, a via penetrating through the intermediate insulating layer 120 may be formed. Accordingly, touch routing connections, connected to the touch sensors of the touch sensor panel 130, may extend to substantially the same height as pixel routing connections, connected to the pixels in the display panel 110, through the vias formed in the via region 121.

In an exemplary embodiment, a touch controller for driving the touch sensor panel 130 may be disposed at substantially the same height as the display panel 110 by extending the touch routing connections to substantially the same height as the pixel routing connections using the vias of the via region 121. A display driver, connected to pixels by the pixel routing connections of the display panel 110, and a pixel compensation circuit may be disposed at substantially the same height as the display panel 110. In an exemplary embodiment, the display driver, the pixel compensation circuit, and the touch controller may be mounted on a single semiconductor chip to implement a touch display controller and to improve the integration density of the touch display system 100. The touch display controller may be connected to the touch sensors by the touch routing connections, and may be connected to the display pixels by the pixel routing connections.

The exemplary embodiment described with reference to FIG. 8 may, of course, be modified. For example, pixel routing connections connected to a gate line and a source line of the display panel 110 through the via area 120 may extend to the same height as the touch sensor panel 130, and the touch display controller may be disposed at the same height as the touch sensor panel 130. In addition, a fingerprint controller for controlling a fingerprint sensor, which may be integrated with or independent of the touch sensor panel 130, may also be included in the touch display controller.

Referring to FIG. 9, a touch display system 200 may include a touch display panel 210, a routing area 220, a touch display controller 230, and the like. For example, the touch display system 200 may be connected to an external host 250, an internal application processor, or the like. However, this is just an example and, the host 250 may be replaced with a central processing unit (CPU), a system on chip (SoC), or the like, based on a type of an electronic device to which the touch display system 200 is applied.

The touch display panel 210 may include a display panel and a touch sensor panel, as described above with reference to FIG. 8. A routing area 220 may include pixel routing connections 221, connected to pixels of the display panel, and touch routing connections 222, connected to touch sensors of the touch sensor panel. At least a portion of the pixel routing connections 221 may be connected to a display driver 231, and the other pixel routing connections 221 may be connected to a pixel compensation circuit 232. The touch routing connections 222 may be connected to a touch controller 233.

At least a portion of the display driver 231, the pixel compensation circuit 232, and the touch controller 233, included in the touch display controller 230, may share an analog circuit. In an exemplary embodiment, when the touch display controller 230 also includes a fingerprint controller, the fingerprint controller may also share the analog circuit. As an example, the pixel compensation circuit 232 and the touch controller 233 may share at least a portion of an analog front-end circuit such as an amplifier, a filter, a variable gain amplifier, a correlated double sampler, integrators, and an analog-to-digital converter converting an analog signal to a digital signal. Accordingly, power consumption of the touch display controller 230 may be reduced while decreasing the volume of the touch display controller 230 and increasing its integration density.

In the exemplary embodiment illustrated in FIG. 9, the touch sensor panel may be disposed above the display panel. The touch routing connections 222, connected to the touch sensors, may be connected to the touch sensors of the touch sensor panel by vias penetrating through the intermediate insulating layer disposed between the touch sensor panel and the display panel. For example, the touch routing connections 222 and the pixel routing connections 221 may be disposed on the same layer, and the touch routing connections 222 may be connected to touch sensors disposed above the touch routing connections 222 and the pixel routing connections 221.

In an exemplary embodiment illustrated in FIG. 9, a digital signal output by the touch display controller 230 may be processed by the host 250. However, according to another embodiment, the touch display controller 230 may include a processor, processing a digital signal to determine a touch input, to display an image, and to compensate for a change in characteristics of pixels, therein. When the touch display controller 230 includes a processor therein, the processor may be shared by the display driver 231, the pixel compensation circuit 232, the touch controller 233, and optionally the fingerprint controller.

Figure 10:
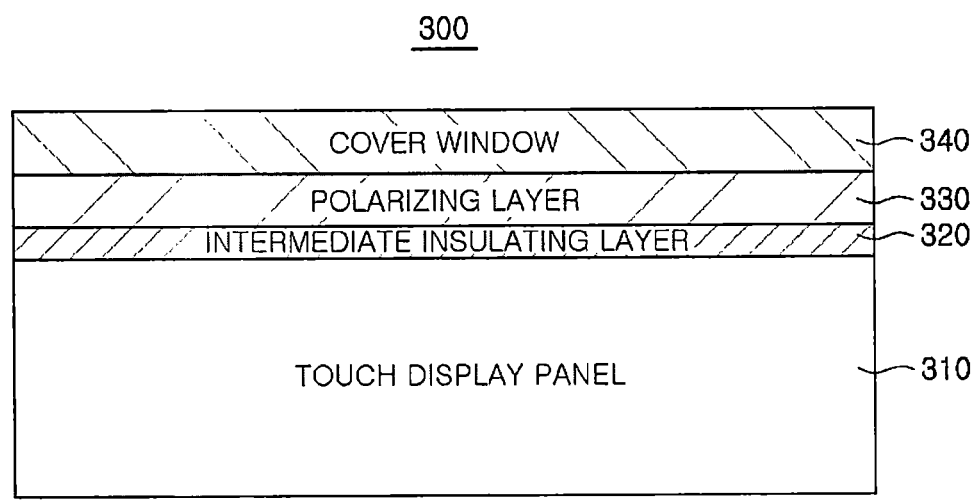
FIG. 10 is a cross-sectional diagram of a touch display system according to an exemplary embodiment.
Figure 11:
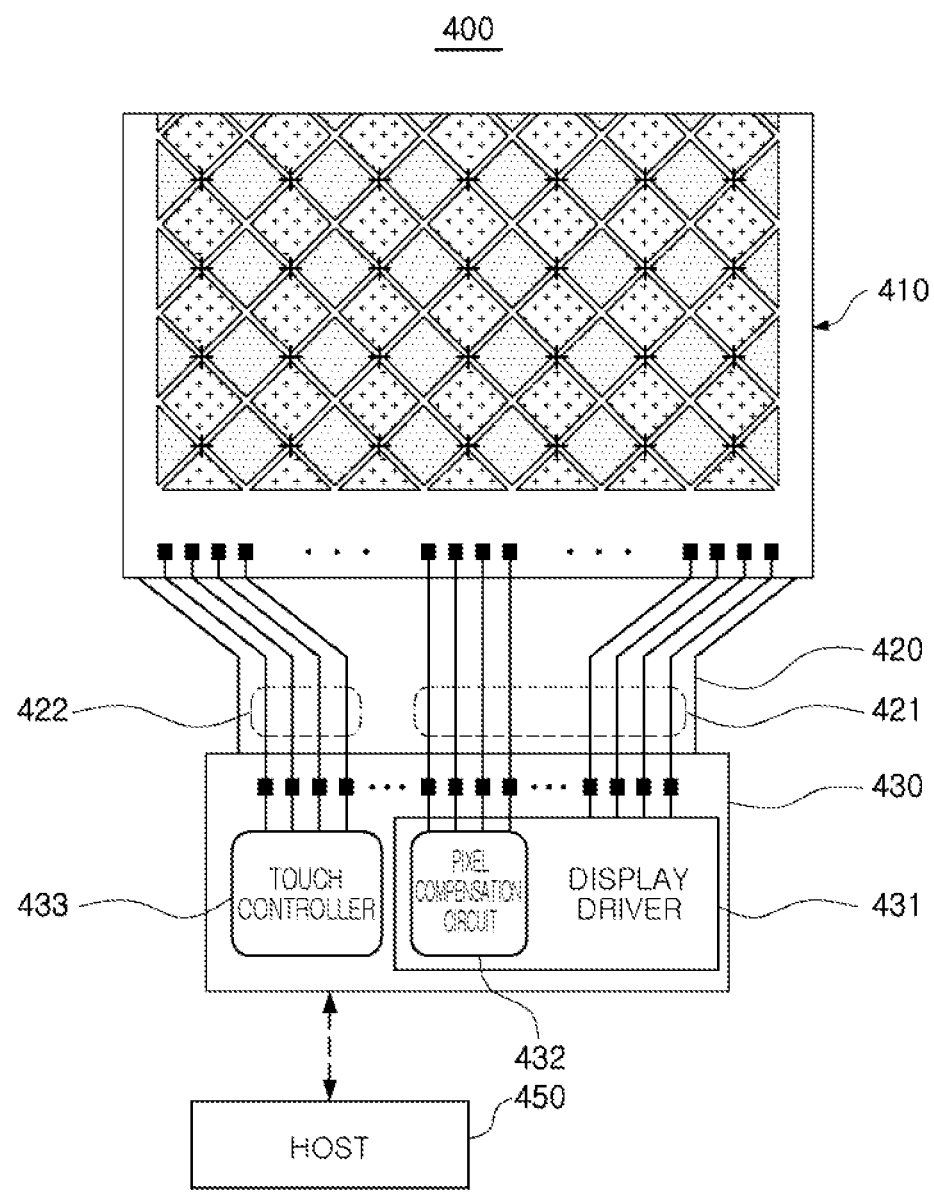
FIG. 11 is a schematic diagram of a touch display system according to an exemplary embodiment.

FIGS. 10 and 11 illustrate touch display systems according to exemplary embodiments.

Referring first to FIG. 10, a touch display system 300 according to an exemplary embodiment includes a touch display panel 310, an intermediate insulating layer 320, a polarizing layer 330, and a cover window 340. In the touch display system 300 illustrated in FIG. 10, touch sensors for sensing a touch input and pixels for displaying an image may be implemented in a single touch display panel 310.

In the exemplary embodiment illustrated in FIG. 10, since touch sensors and pixels are all formed on the same touch display panel 310, the touch sensors and the pixels may be connected to a touch display controller without needing vias through the intermediate insulating layer 320. For example, touch routing connections connected to the touch sensors and pixel routing connections connected to the pixels may be formed at the same height in a single touch display panel 310. Thus, the touch routing connections and the pixel routing connections may be connected to the touch display controller without vias.

Referring to FIG. 11, a touch display system 400 may include a touch display panel 410, a routing area 420, a touch display controller 430, and the like. The touch display system 400 may be connected to an external host 450, for example, an application processor, a central processing unit, and/or the like.

Similar to the description above with reference to FIG. 10, the touch display panel 410 may include a display panel and a touch sensor panel integrated with each other. A routing area 420 may include pixel routing connections 421 connected to pixels of the touch display panel 410, touch routing connections 422 connected to touch sensors, and the like. At least a portion of the pixel routing connections 421 may be connected to a display driver 431, and the other pixel routing connections 421 may be connected to a pixel compensation circuit 432. The touch routing connections 422 may be connected to a touch controller 433.

At least a portion of the display driver 431, the pixel compensation circuit 432, and the touch controller 433, included in the touch display controller 430, may share an analog circuit, an analog-to-digital converter, and the like. When a fingerprint controller is also included in the touch display controller 430, the fingerprint controller may also share the analog circuit, the analog-to-digital converter, and the like. As an example, the pixel compensation circuit 432 and the touch controller 433 may share analog front-end circuits, such as a charge amplifier, a filter, a variable gain amplifier, a correlated double sampler, an integrator, and an analog-to-digital converter converting an output of the analog front-end circuit into a digital signal. Thus, integration density of the touch display controller 430 may be increased, and power consumption of the touch display controller 430 may be reduced.

In the exemplary embodiment illustrated in FIG. 11, a digital signal output by the touch display controller 430 may be processed by the host 450. However, according to another exemplary embodiment, the touch display controller 430 may include a processor, processing a digital signal to determine a touch input, to display an image, and to compensate for a change in characteristics of pixels, therein. When the touch display controller 430 includes a processor therein, the processor may be shared by the display driver 431, the pixel compensation circuit 432, the touch controller 433, and optionally the fingerprint controller.

In the exemplary embodiment illustrated in FIG. 11, touch sensors and pixels may be implemented on a single layer of the touch display panel 410. Thus, the touch routing connections 422 may be directly connected to the touch sensors and the pixel routing connections 421 may be directly connected to the display pixels, without connection through vias.

Figure 12:
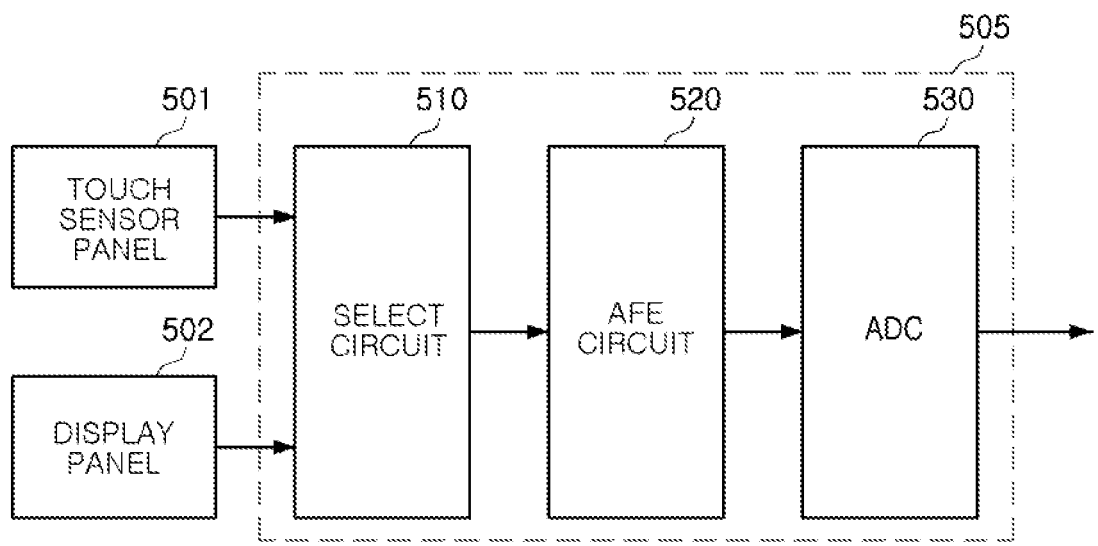
FIG. 12 is a schematic block diagram of a touch display controller according to an exemplary embodiment.
Figure 13:
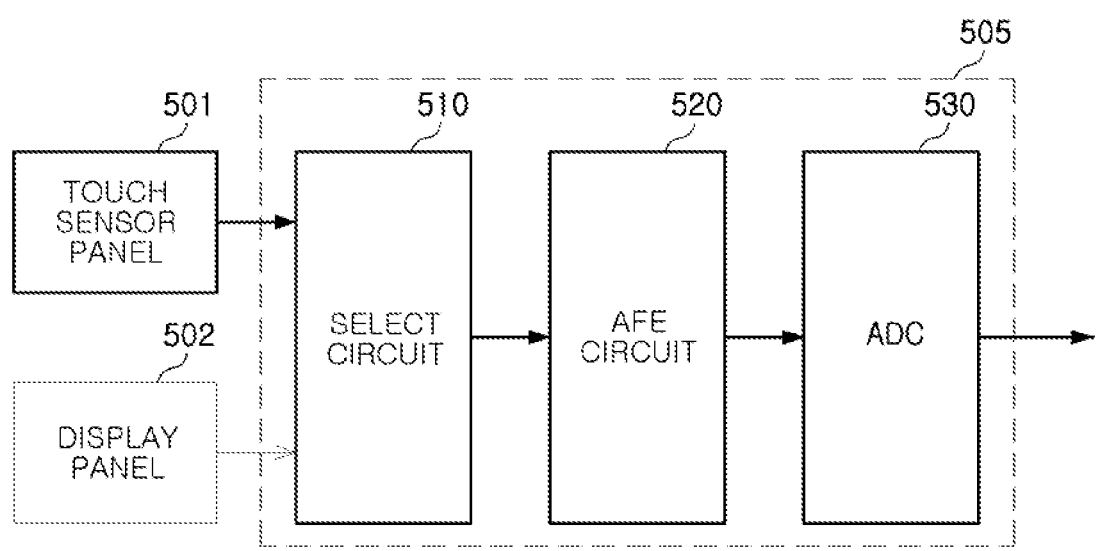
FIG. 13 is a hybrid schematic block operation diagram of a touch display controller according to an exemplary embodiment.
Figure 14:
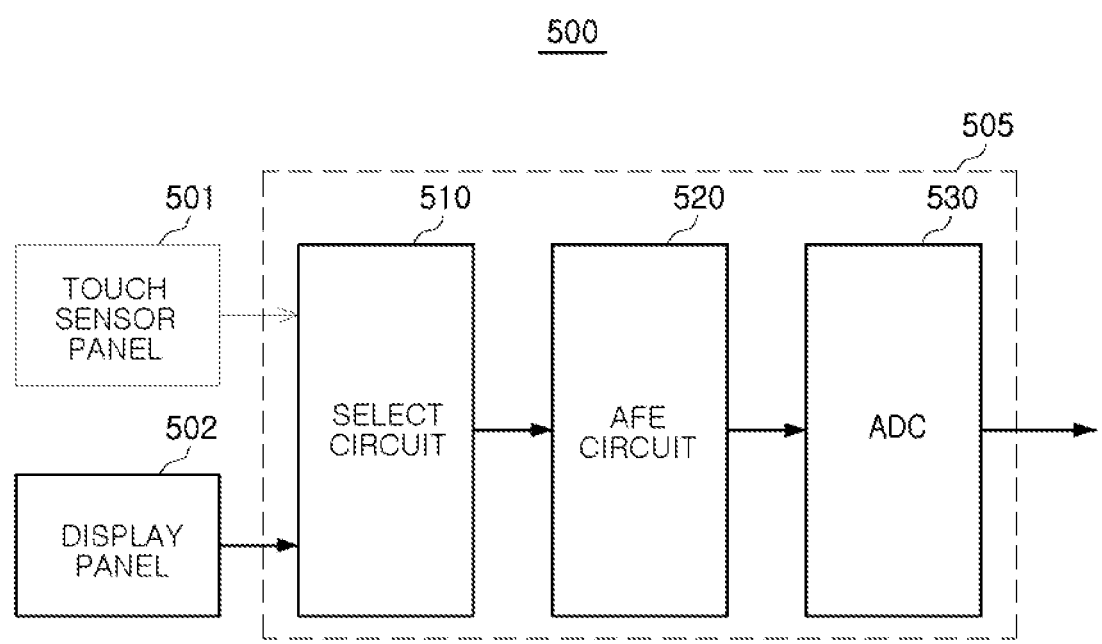
FIG. 14 is a hybrid schematic block operation diagram of a touch display controller according to an exemplary embodiment.

FIGS. 12 to 14 illustrate a touch display controller according to an exemplary embodiment.

Referring to FIG. 12, a touch display system 500 according to an exemplary embodiment may include a touch sensor panel 501 and a display panel 502, a touch display controller 505, and the like. The touch display controller 505 may determine a touch input based on a change in capacitance occurring in the touch sensor panel 501, and may detect a change in characteristics of pixels of the display panel 502 to adjust signals input to the pixels.

The touch display controller 505 may include a select circuit 510, an analog front-end (AFE) circuit 520 connected to the select circuit, an analog-to-digital converter 530 connected to the AFE circuit, and the like. The select circuit 510 may switchably connect one at a time of the touch sensor panel 501 or the display panel 502 to the analog front-end circuit 520. As an example, the select circuit 510 may be implemented as a switch circuit such as a multiplexer, or the like.

As illustrated in FIG. 13, when the analog front-end circuit 520 is connected to the touch sensor panel 501 by the select circuit 510, the touch display controller 505 may operate as a controller to determine a touch input. Otherwise, as illustrated in FIG. 14, when the analog front-end circuit 520 is connected to the display panel 502 by the select circuit 510, the touch display controller 505 may operate as a pixel compensation circuit for compensating for a change in characteristics of pixels.

Figure 15:
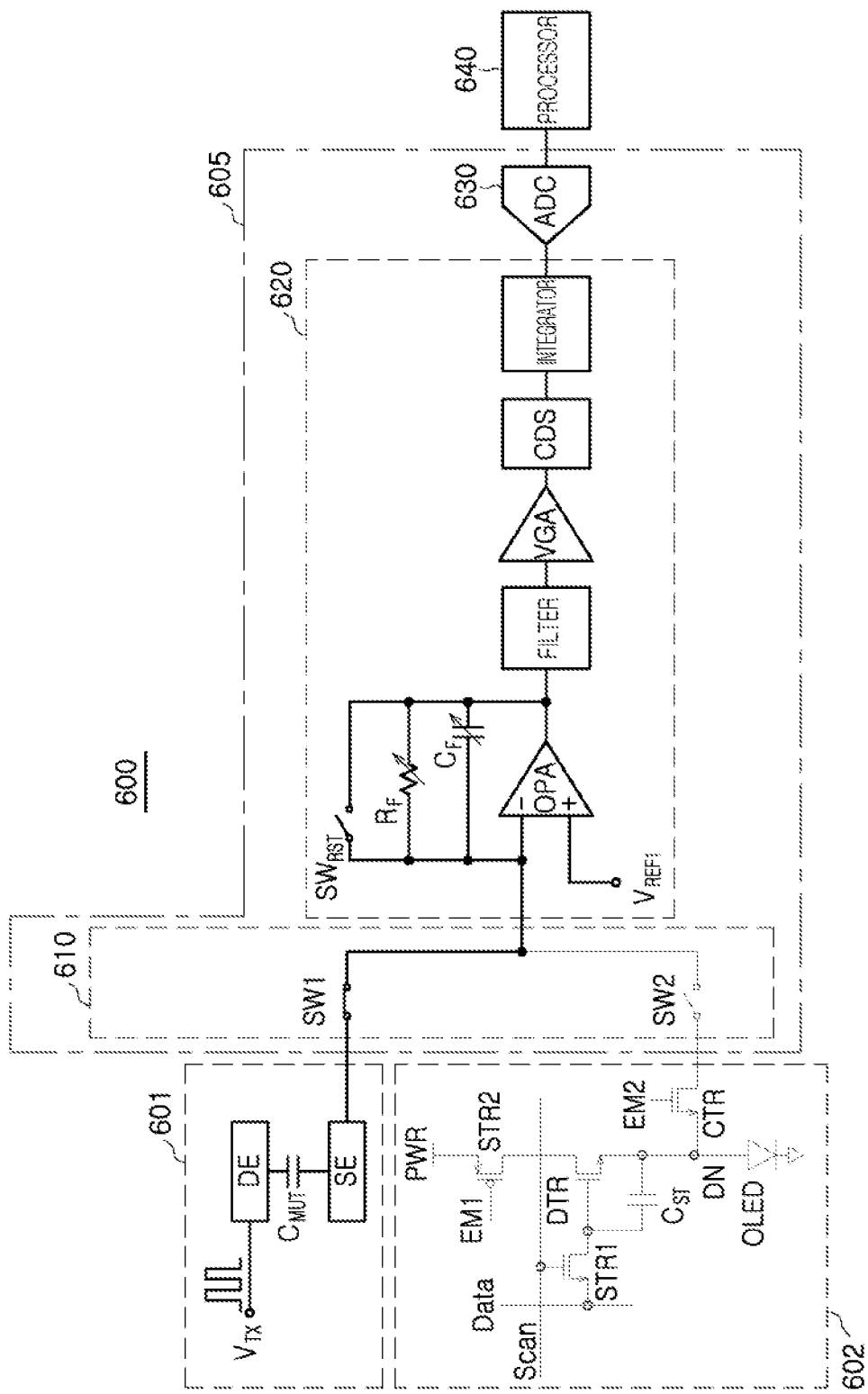
FIG. 15 is a hybrid schematic circuit operation diagram of a touch display controller according to an exemplary embodiment.
Figure 16:
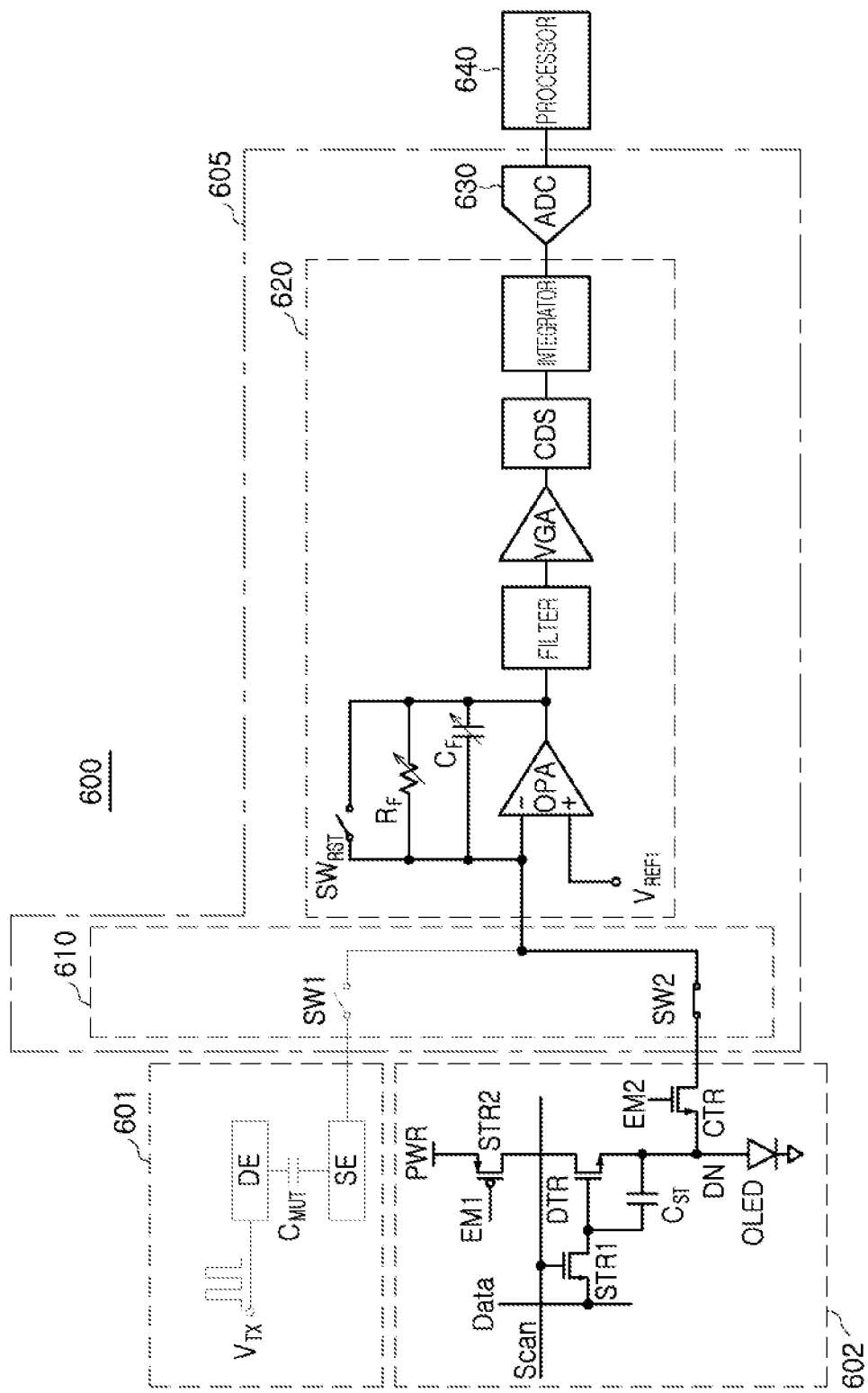
FIG. 16 is a hybrid schematic circuit operation diagram of a touch display controller according to an exemplary embodiment.

FIGS. 15 and 16 illustrate an operation of a touch display controller according to an exemplary embodiment.

Referring to FIGS. 15 and 16, in a touch display system 600 according to an exemplary embodiment, a touch display controller 605 may include a select circuit 610, an analog front-end circuit 620 connected to the select circuit, an analog-to-digital converter (ADC) 630 connected to the analog front-end circuit, and the like. In the exemplary embodiments illustrated in FIGS. 15 and 16, a processor 640 is illustrated as being additionally connected to an outside of the touch display controller 605. However, it shall be understood that the processor 640 may be incorporated within the touch display controller 605.

The touch display controller 605 may be connected to a touch sensor 601 or a pixel 602 of a display panel through the select circuit 610. The description of the touch sensor 601 may be similarly applied to a fingerprint sensor. In addition, although the pixel 602 is illustrated as including an organic light-emitting diode (OLED), the description of the pixel 602 may be similarly applied to a pixel of a liquid crystal display or the like.

The select circuit 610 may include a first switch SW1, a second switch SW2, and the like. The touch display controller 600 may control on/off of the first switch SW1 and the second switch SW2 to connect the touch sensor 601 or the pixel 602 to the analog front-end circuit 620. The analog front-end circuit 620 may include a charge amplifier based on an operational amplifier (OPA), a filter connected to the charge amplifier, a variable gain amplifier (VGA) connected to the filter, a correlated double sampler (CDS) connected to the VGA, an integrator connected to the CDS, and the like. However, components included in the analog front-end circuit 620 may be changed according to alternate embodiments.

Referring to FIG. 15, a description will be given of an operation when the first switch SW1 is turned on and the touch sensor 601 is connected. When the first switch SW1 is turned on and the second switch SW2 is turned off, the touch sensor 601 may be connected to the charge amplifier of the analog front-end circuit 620. Thus, the touch display controller 600 may operate as a touch controller.

When a driving signal VTX is input to a driving electrode DE of the touch sensor 601, mutual capacitance CMUT may be generated between the driving electrode DE and a sensing electrode SE. When the mutual capacitance CMUT is changed by a touch input, the charge amplifier may amplify the change in mutual capacitance CMUT and may output a voltage signal. A magnitude of the voltage signal may be affected by a feedback resistor RF and a feedback capacitor CF included in the charge amplifier, in addition to the amount of change in mutual capacitance CMUT. When the reset switch SWRST is turned on, an output of the charge amplifier may be reset.

According to another exemplary embodiment, the driving signal VTX need not be input to the touch sensor 601. When the driving signal VTX is not input, a predetermined reference voltage may be input to electrodes DE and SE of the touch sensor 601. In the electrodes DE and SE, self-capacitance may be generated by the reference voltage. When a change in self-capacitance occurs due to the touch input, the charge amplifier may amplify the change in self-capacitance to output a voltage signal.

The filter may, for example, low-pass filter the voltage signal output by the charge amplifier. A cutoff frequency of the filter may be variously determined. As an example, a cutoff frequency in the case in which the driving signal VTX is input to the touch sensor 601 in a mutual capacitance scheme, and a cutoff frequency in the case in which the driving signal VTX is not input in a self-capacitance scheme, may be different from each other. The variable gain amplifier may amplify an output of the filter, and an analog signal may be output to the analog-to-digital converter 630 through the correlated double sampler and the integrator.

The analog-to-digital converter 630 may convert the analog signal into a digital signal. The processor 640 may, in turn, receive the digital signal and determine coordinates, number, gesture, and the like, of the touch input applied to the touch sensor 601. The processor 640 may be implemented in an external host connected to the touch display controller 605, such as, for example, an application processor, or may be mounted inside of the touch display controller 605 according to another exemplary embodiment.

Turning to FIG. 16, when the second switch SW2 is turned on and the first switch SW1 is turned off, the pixel 602 may be connected to the charge amplifier. Thus, the touch display controller 600 may also operate as a pixel compensation circuit. The display pixel 602 may include a first select element STR1 and a second select element STR2, a storage capacitor CST, a driving element DTR, a compensation element CTR, and the like. The storage capacitor CST may be charged with electrical charges by a scanning signal Scan and a data signal Data. When the second select element STR2 is turned on by the first control signal EM1, an organic light-emitting diode OLED may be turned on by current flowing through the driving element DTR. The scanning signal Scan may be input through a gate line of the display panel, and the data signal Data may be input through a source line of the display panel.

As an example, a threshold voltage of the elements STR1, STR2, and DTR included in the pixel 602 or a threshold voltage of the organic light-emitting diode (OLED) may vary based on a change in a usage environment such as an external temperature, or the like, of the touch display system, and/or based on an accumulation of use time of the touch display system. With the variation of the threshold voltages, driving current input to the OLED through a driving node DN may vary and performance of the display device may be deteriorated. The touch display controller 605 may operate as a pixel compensation circuit to maintain the performance of the display device, substantially irrespective of the use environment or the use time.

In an exemplary embodiment, the touch display controller 605, while operating as a pixel compensation circuit, may adjust a second control signal EM2 to turn on the compensation element CTR and to detect a driving current flowing to a driving node DN. The touch display controller 605 may adjust the data signal Data input to the first select element STR1 with reference to the driving current. As an example, the touch display controller 605 may adjust the data signal Data with reference to a look-up table in which a relationship between the driving current, flowing to the driving node DN, and the data signal Data are defined.

In an exemplary embodiment, the touch display controller 605 may adjust another voltage input to the pixel 602, other than the data signal Data, with reference to the driving current flowing to the driving node DN. As an example, the touch display controller 605 may detect the driving current to adjust a reference voltage input to the pixel 602.

In the touch display controller 605 operating as the pixel compensation circuit, the charge amplifier may generate a voltage signal corresponding to the current flowing to the driving node DN. A magnitude of the voltage signal, output by the charge amplifier, may be affected by a feedback resistor RF and a feedback capacitor CF included in the charge amplifier in addition to the magnitude of the current flowing to the driving node DN.

The filter may filter, for example, low-pass filter the voltage signal output by the charge amplifier. A cutoff frequency of the filter may vary according to exemplary embodiments. The variable gain amplifier may amplify an output of the filter, and the analog signal finally generated by the correlated double sampler and the integrator may be then output to the analog-to-digital converter.

As described with reference to FIGS. 15 and 16, in an exemplary embodiment, a touch controller driving the touch sensor 601 and a pixel compensation circuit compensating for a variation in threshold voltage or the like of the pixel 602 may share the analog front-end circuit 620 and the analog-to-digital converter 630 in a single touch display controller 605. Since both the touch controller and the pixel compensation circuit may be implemented with a single analog front-end circuit 620 and a single analog-to-digital converter 630, a design of the touch display controller 605 may be simplified, power consumption thereof may be reduced, and a volume thereof may be reduced. According to an exemplary embodiment, only the analog front-end circuit 620 might be shared by the touch sensor 601 and the pixel 602 in consideration of a dynamic range, or the like. Alternatively, the processor 640 on a rear end of the analog-to-digital converter (ADC) 630 may be mounted in the touch display controller 605 to be shared by the touch sensor 601 and the pixel 602, along with the ADC itself.

According to an exemplary embodiment, a change in mutual capacitance CMUT, output from the touch sensor 601, and/or a change in self capacitance, output from the touch sensor 601, may be defined in a range different from a range of a change in the magnitude of the driving current input to the OLED of the pixel 602. As an example, a minimum value and a maximum value defining the change in capacitance detected by the touch sensor 601, may be different from a minimum value and a maximum value defining the change in the driving current detected in the pixel 602.

Accordingly, when operating conditions of the analog front-end circuit 620 are the same irrespective of one of the touch sensor 601 and the pixel 602 selected by the select circuit, the analog-to-digital converter 630 may be saturated by an output of the analog front-end circuit 620 or an output of the analog-to-digital converter 630 may not sufficiently reflect the change in capacitance of the touch sensor 601 or the change in driving current of the pixel 602, for example.

In exemplary embodiments, the above issue may be addressed by changing the operating conditions of at least one of the circuits included in the analog front-end circuit 620 based on a configuration connected to the analog front-end circuit 620. As an example, a control operation such as changing values of a feedback resistor RF and a feedback capacitor CF included in the charge amplifier, changing a gain of the variable gain amplifier, changing a cutoff frequency of the filter, adjusting integration time of the integrator, or the like, may be performed. The control of the analog front-end circuit 620 may be further described with reference to FIG. 19.

Figure 17:
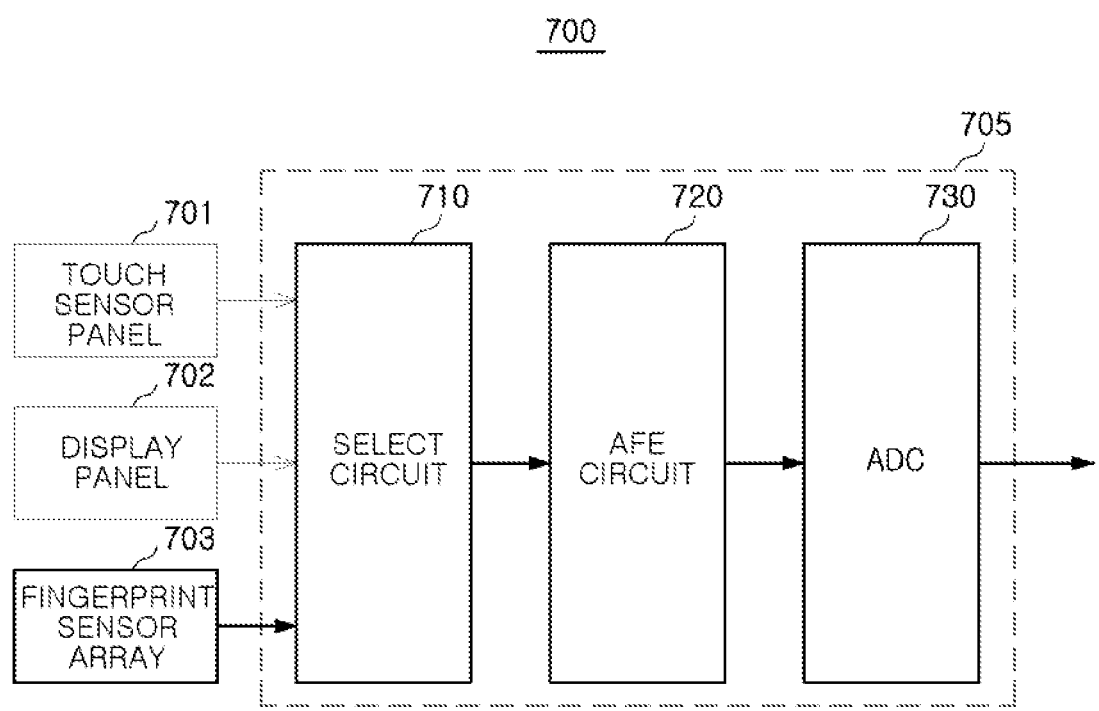
FIG. 17 is a hybrid schematic block operation diagram of a touch display controller according to an exemplary embodiment.

FIG. 17 illustrates a touch display controller according to an exemplary embodiment.

Referring to FIG. 17, a touch display system 700 according to an exemplary embodiment may include a touch sensor panel 701, a display panel 702, a fingerprint sensor array 703, a touch display controller 705, and the like. The touch display controller 705 may determine a touch input based on a change in capacitance occurring in the touch sensor panel 701, may detect a change in characteristics of pixels of the display panel 702 to adjust a signal input to the pixels, and may detect a change in capacitance or an optical signal, occurring in the fingerprint sensor array 703, to determine a fingerprint input. As an example, the fingerprint sensor array 703 may be integrated with at least one of the touch sensor panel 701, the display panel 702, the camera 6 of FIG. 1, or may be provided as an additional device.

The touch display controller 705 may include a select circuit 710, an analog front-end (AFE) circuit 720, an analog-to-digital converter (ADC) 730, and the like. The select circuit 710 may switchably connect one of the touch sensor panel 701, the display panel 702, and the fingerprint sensor array 703 to the analog front-end circuit 720. As an example, the select circuit 710 may be implemented as a switch circuit, such as a multiplexer.

As illustrated in 17, when the analog front-end circuit 720 is connected to the fingerprint sensor array 703 by the select circuit 710, the touch display controller 705 may operate as a fingerprint controller to determine a fingerprint input. The analog front-end circuit 720 may generate an analog signal corresponding to a change in capacitance or an optical signal occurring in the fingerprint sensor array 703, and the analog-to-digital converter 730 may convert the analog signal into a digital signal and may output the converted digital signal. A processor, internal or optionally external to the touch display system 700, receiving the digital signal from the analog-to-digital converter 730, may determine whether a fingerprint contacting the fingerprint sensor array 703 is a legitimate user's fingerprint based on the digital signal.

Figure 18:
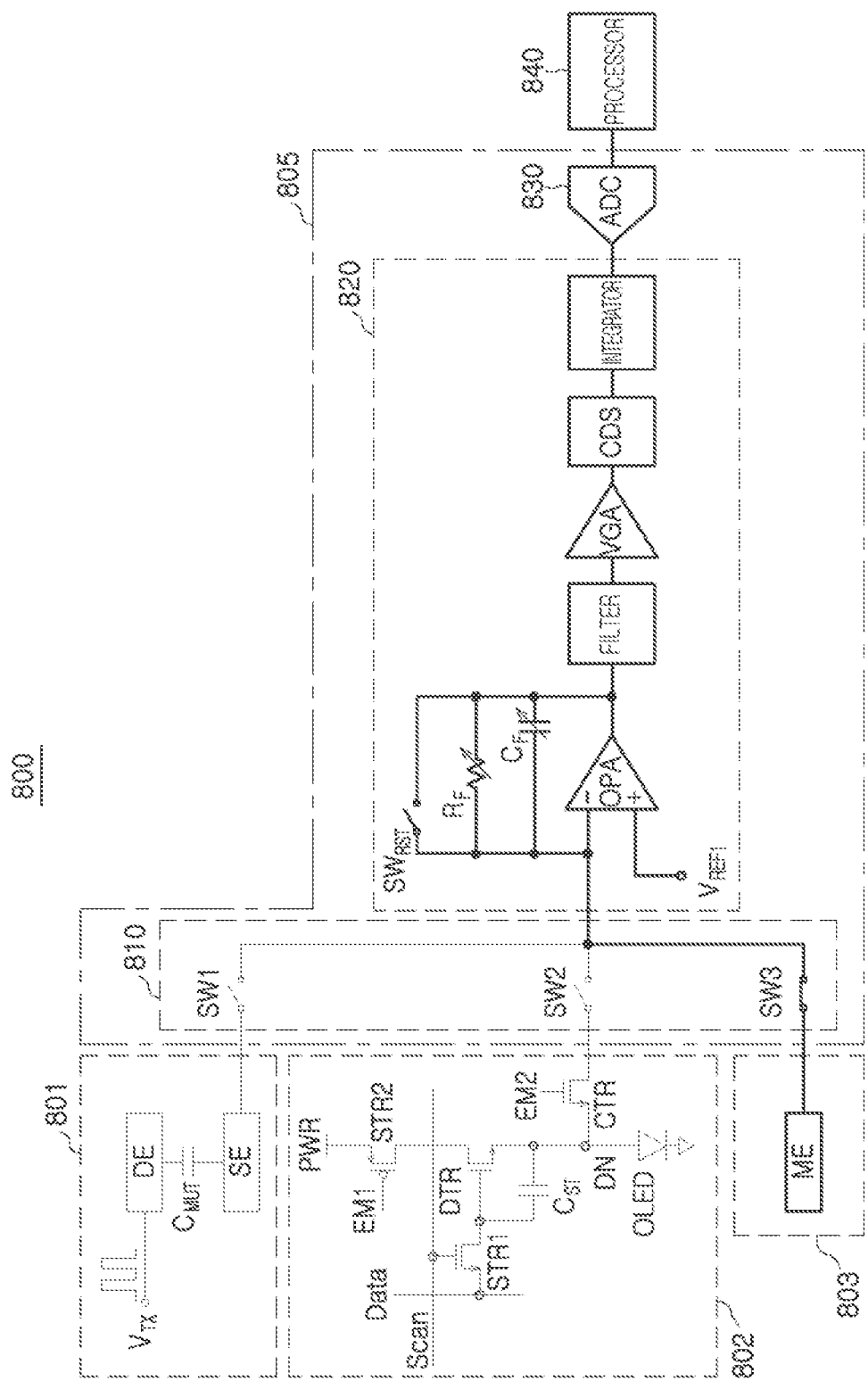
FIG. 18 is a hybrid schematic circuit operation diagram of a touch display controller according to an exemplary embodiment.

FIG. 18 illustrates an operation of a touch display controller according to an exemplary embodiment. To the extent that this embodiment is similar to previously described embodiments, duplicate description may be omitted.

Referring to FIG. 18, in a touch display system 800 according to an exemplary embodiment, a touch display controller 805 may include a select circuit 810, an analog front-end circuit 820, an analog-to-digital converter 830, and the like. In the exemplary embodiment illustrated in FIG. 18, a processor 840 internal to the touch display system 800 may be additionally connected to an outside of the touch display controller 805. Alternatively, the processor 840 may be integrated within the touch display controller 805.

The touch display controller 805 may be switchably connected to one of a touch sensor 801, a pixel 802 of a display panel, and a fingerprint sensor 803 of a fingerprint sensor array, through the select circuit 810. The select circuit 810 may include a plurality of switches SW1 to SW3. The touch display controller 800 may control on/off of the switches SW1 to SW3 to control one at a time of the touch sensor 801, the pixel 802, and the fingerprint sensor 803 to connect to the analog front-end circuit 820.

In an exemplary embodiment illustrated in FIG. 18, the fingerprint sensor 803 may be connected through the select circuit 810 to the analog front-end circuit 820. When the third switch SW3 is turned on and the first switch SW1 and the second switch SW2 are turned off, a fingerprint sensing electrode ME of the fingerprint sensor 803 may be connected to the analog front-end circuit 820. A charge amplifier including the operational amplifier OPA may amplify a change in capacitance occurring in the fingerprint sensing electrode ME in correspondence with a fingerprint input received to output a voltage signal. While outputting an analog signal using a filter, a variable gain amplifier, a correlated double sampler, an integrator, and the analog-to-digital converter 830 may convert the analog signal into a digital signal. The processor 840 may determine whether a user is authenticated according to the fingerprint input, using the digital signal.

Figure 19:
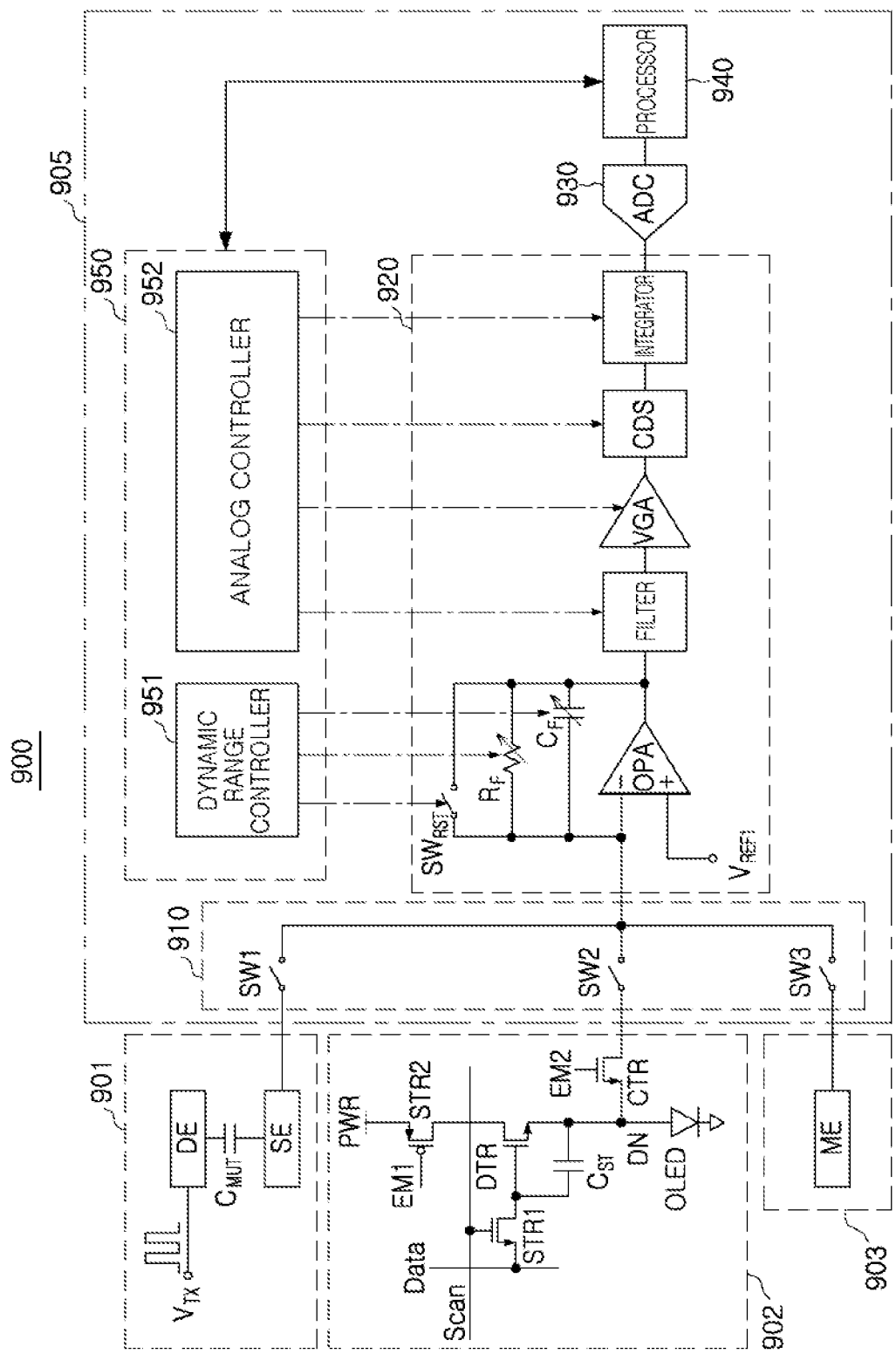
FIG. 19 is a schematic circuit diagram of a touch display controller according to an exemplary embodiment.

FIG. 19 illustrates a touch display controller according to an exemplary embodiment.

Referring to FIG. 19, in a touch display system 900 according to an exemplary embodiment, a touch display controller 905 may be connected to a touch sensor 901, a pixel 902, a fingerprint sensor 903, and the like. Configurations and operations of the touch sensor 901, the pixel 902, and the fingerprint sensor 903 may be understood with reference to the descriptions of the exemplary embodiments illustrated in FIGS. 15, 16, and 18, for example, so duplicate description may be omitted. In addition, the touch sensor 901 is implemented on a touch sensor panel, and the pixel 902 is implemented on a display panel. Arrangements and structures of touch routing connections and pixel routing connections, connecting the touch sensor panel and the display panel to the touch display controller 905, may be understood with reference to the description of the exemplary embodiments illustrated in FIGS. 8 to 11, for example, so duplicate description may be omitted.

The touch display controller 905 may include a select circuit 910, an analog front-end circuit 920, an analog-to-digital converter 930, a processor 940, a control circuit 950, and the like. In the exemplary embodiment illustrated in FIG. 19, the processor 940 and the control circuit 950 are illustrated as being included in the touch display controller 905. However, at least one of the processor 940 or the control circuit 950 may be provided outside of the display controller 905 but within the touch display system 900. In addition, the control circuit 950 may be integrated within the processor 940.

The select circuit 910 may connect one of the touch sensor 901 of the touch sensor panel, the pixel 902 of the display panel, and the fingerprint sensor 903 of the fingerprint sensor array, to the analog front-end circuit 920. A charge amplifier of the analog front-end circuit 920 may output a voltage signal corresponding to the touch sensor 901, the pixel 902, and the fingerprint sensor 903. In this case, ranges of a change in capacitance and/or a change in current or like electrical property, occurring in each of the touch sensor 901, the pixel 902, and the fingerprint sensor 903, may be different from each other. Accordingly, when the analog front-end circuit 920 operates under only one operating condition, a voltage signal may not sufficiently reflect the change in capacitance and/or the change in current, occurring in each of the touch sensor 901, the pixel 902, and the fingerprint sensor 903, or the voltage signal may be saturated.

In the exemplary embodiment illustrated in FIG. 19, a dynamic range controller 951 may adjust at least one of a reset switch SWRST, a resistor Rn, and a capacitor Cn included in the charge amplifier. As an example, the dynamic range controller 951 may adjust a magnitude of at least one of a feedback resistor RF and a feedback capacitor CF to adjust a magnitude of a voltage signal output by the charge amplifier. Thus, undersaturation, oversaturation, or the like, of the analog-to-digital converter 630 may be prevented. For example, the dynamic range controller 951 may adjust an amplification gain of the charge amplifier according to a component connected to the charge amplifier by the select circuit 910.

As an example, it may be assumed that a range of a change in capacitance occurring in the touch sensor 901 is 1 to 10, and a range of driving current flowing to a driving node DN of the pixel 902 is 0.1 to 1. However, this assumption is merely exemplary for ease of description, and it will be understood that embodiments are not necessarily limited to such numerical limitations. When each of the feedback resistor RF and the feedback capacitor CF of the charge amplifier has a fixed magnitude, an output of the charge amplifier may be significantly increased by an output of the touch sensor 901 to saturate the analog-to-digital converter 930. In addition, when the feedback resistor RF and the feedback capacitor CF, each having a small value, are selected to prevent the saturation of the analog-to-digital converter 930 based on the output of the touch sensor 901, a change in driving current input to an organic light-emitting diode (OLED) of a pixel 902 may not be sufficiently reflected in the output of the analog-to-digital converter 930. Accordingly, such a touch display controller might not sufficiently function as a pixel compensation circuit without dynamic range compensation.

To address the above issue, in an exemplary embodiment, the control circuit 950 may control an operation of an analog front-end circuit. As an example, when the touch sensors 901 are connected to the analog front-end circuit 920 by the select circuit 910, the control circuit 950 may set a signal amplification gain of the analog front-end circuit 920 to a first value. In addition, when the pixels 902 are connected to the analog front-end circuit 920 by the select circuit 910, the control circuit 950 may set the signal amplification gain of the analog front-end circuit 920 to a second value different from the first value.

As an example, the dynamic range controller 951 may control the charge amplifier based on whether the configuration, connected to the analog front-end circuit 920 by the select circuit 910, is the touch sensor 901, the pixel 902, or the fingerprint sensor 903. As an example, in the case in which the above assumption is applied as it is, when the touch sensor 901 is connected to the analog front-end circuit 920, a magnitude of at least one of the feedback resistor RF and the feedback capacitor CF may be adjusted to reduce a gain of the charge amplifier. Thus, saturation of the analog-to-digital converter 930 may be prevented. On the other hand, when the pixel 902 is connected to the analog front-end circuit 920, the magnitude of at least one of the feedback resistor RF and the feedback capacitor CF may be adjusted to increase the gain of the charge amplifier. Thus, a change in driving current of the pixel 902 may be sufficiently reflected on the digital signal output by the analog-to-digital converter 930.

The analog controller 952 may control the filter, the variable gain amplifier, the correlated double sampler, and the integrator connected between the charge amplifier and the analog-to-digital converter 930. As an example, the analog controller 952 may control a cutoff frequency of the filter, a gain of the variable gain amplifier, an integration time of the integrator, and the like, such that the analog-to-digital converter 930 is neither under-driven nor over-saturated. Moreover, the analog controller 952 may control the filter, the variable gain amplifier, the correlated double sampler, and the integrator such that outputs of the touch sensor 901 and the pixel 902 are sufficiently reflected on the digital signal output by the analog-to-digital converter 930.

In brief summary, a touch display system, including a touch sensor panel and a display panel that may but need not be the same panel, a touch controller driving the touch sensor panel and driving a pixel compensation circuit compensating for a variation in threshold voltage of elements included in pixels of the display panel, may be integrated in a single semiconductor chip with shared circuit paths. In addition, the touch controller and the pixel compensation circuit may share at least a portion of an analog front-end circuit, an analog-to-digital converter, and a processor processing a digital signal. A select circuit, such as but not limited to a multiplexer, may be connected between the touch display panel and an input terminal of the analog front-end circuit to alternately connect one of the touch sensors or pixels to the analog front-end circuit.

In exemplary embodiments, a select circuit may connect an analog front-end circuit to pixels of a display panel in every predetermined period in which a threshold voltage for the pixels of the display panel is compensated for. Alternatively, the analog front-end circuit may be connected to the pixels of the display panel in response to a user input generated from user setting items such as display adjustment. Alternatively, the analog front-end circuit may be connected to the pixels of the display panel while the display panel is turned on and a touch input is not generated from a user. Thus, a change in threshold voltage of elements included in pixels of the display panel may be compensated for without affecting the user's touch input.

According to an exemplary embodiment, the touch display system may further include a fingerprint sensor, or the like. A fingerprint controller, connected to the fingerprint sensor to detect a fingerprint input, may also share, with at least one of a touch controller and a pixel compensation circuit, an analog front-end circuit, an analog-to-digital converter, and a processor processing a digital signal.

Figure 20:
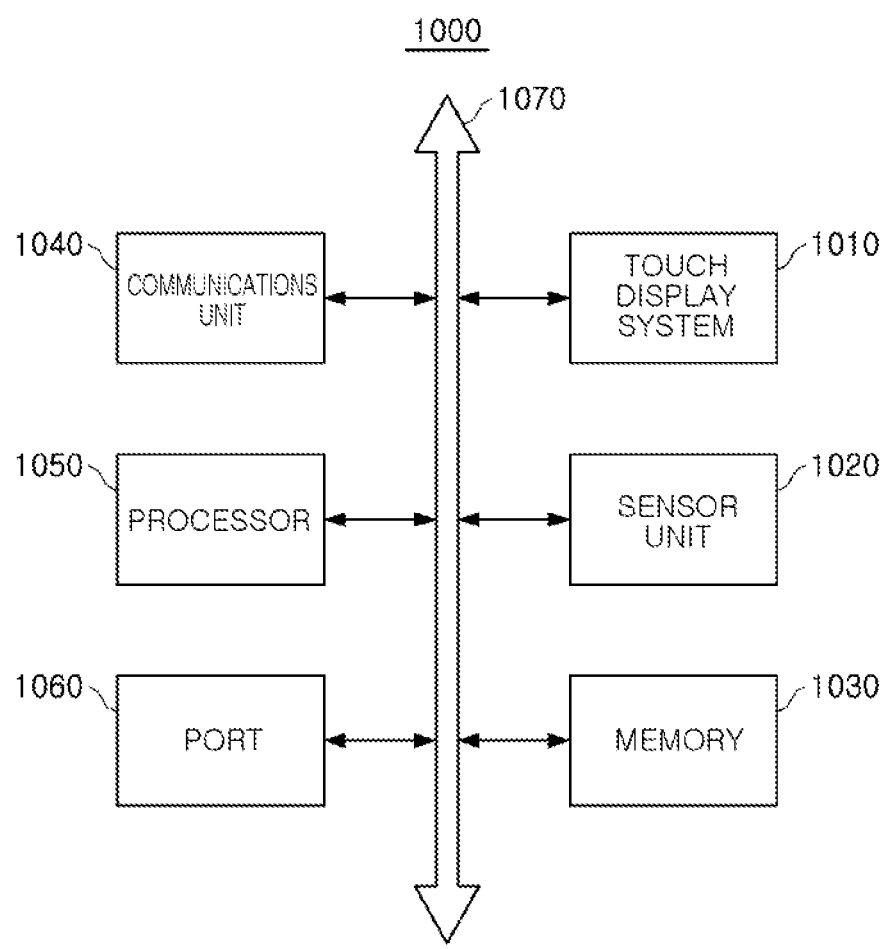
FIG. 20 is a schematic block diagram of an electronic device including a touch display system according to an exemplary embodiment.

FIG. 20 illustrates an electronic device including a touch display system according to an exemplary embodiment.

An electronic device 1000 according to the exemplary embodiment illustrated in FIG. 20 includes a touch display system 1010, a sensor unit 1020, a memory 1030, a communications unit 1040, a processor 1050, a port 1060, and the like, each connected to an internal communications bus 1070. In addition, the electronic device 1000 may further include a power supply, an input/output unit, and the like. Among the components illustrated in FIG. 20, the port 1060 may be a device provided for the electronic device 1000 to communicate with a video card, a sound card, a memory card, a USB device, and the like. The electronic device 1000 may embody a comprehensive concept including any one or more of a smartphone, a tablet PC, and a smart wearable device, an integrated device in a smart appliance or conveyance, as well as a general desktop computer or a general laptop computer.

The processor 1050 may perform specific arithmetic operations, commands, tasks, and the like. The processor 1050 may be a central processing unit (CPU), a microprocessor unit (MCU), or a system on chip (SoC) and may communicate with the touch display system 1010, the senor unit 1020, the memory 1030, and the communications unit 1040 as well as other devices connected to the port 1060, via a bus 1070.

The memory 1030 may be a storage medium storing data required for operations of the electronic device 1000, such as but not limited to multimedia data or the like. The memory 1030 may include a volatile memory such as a random-access memory (RAM), or a nonvolatile memory such as a flash memory or the like. In addition, the memory 1030 may include at least one of a solid-state drive (SSD), a hard disk drive (HDD), or an optical disk drive (ODD) as a storage device.

The touch display system 1010 may include a display device, displaying an image, and a touch sensor device sensing a user's touch input. According to an exemplary embodiment, a fingerprint sensor device may also be implemented to be integrated with the touch display system 1010. The touch display system 1010 may include a memory device according to various embodiments described with reference to FIGS. 1 to 19, for example.

As described above, a pixel compensation circuit for pixels of a display device and a touch controller of a touch sensor device may share at least one of an analog front-end circuit, an analog-to-digital converter, and/or a processor processing a digital signal. Thus, integration density of the touch display system may be improved and power consumption and manufacturing costs thereof may be reduced. According to exemplary embodiments, other components such as a fingerprint controller and the like, as well as the touch controller, the display driver, and the pixel compensation circuit, may be additionally mounted on the touch display driver.

While exemplary embodiments have been shown and described above, it will be apparent to those of ordinary skill in the pertinent art that modifications and variations may be made without departing from the scope and spirit of the present inventive concept as defined by the appended claims.

What is claimed is:

1. A touch display controller comprising:
   a select circuit having a first selectable input terminal for touch sensors, a second selectable input terminal for display pixels, and an output terminal;
   an analog front-end circuit coupled to the output terminal of the select circuit to receive a raw analog signal, and having a shared processing path for analog signals from both the touch sensors and the display pixels; and
   a control circuit configured to control the analog front-end circuit based on which type of element among the touch sensors or the display pixels is connected to the analog front-end circuit,
   wherein the analog front-end circuit includes at least one of a charge amplifier, a filter, or a variable gain amplifier,
   wherein the control circuit adjusts at least one of the charge amplifier, the filter, or the variable gain amplifier based on the type of element connected to the analog front-end circuit.

2. The touch display controller of claim 1, further comprising:
   an analog amplifier disposed in the shared processing path of the analog front-end circuit; and
   an analog-to-digital converter coupled to the shared processing path of the analog front-end circuit and configured to output a digital signal based on a processed analog signal,
   wherein the shared processing path through the analog front-end circuit and the analog-to-digital converter is configured to process raw analog signals output by the touch sensor and by the display pixel.

3. The touch display controller of claim 2, further comprising:
   a processor configured to determine a touch input applied to at least one touch sensor based on the digital signal, or to determine a driving current flowing to a light-emitting element of at least one display pixel based on the digital signal.

4. The touch display controller of claim 3, wherein the processor adjusts a magnitude of a voltage, input to at least one of elements driving the light-emitting element in the pixel, to adjust the driving current.

5. The touch display controller of claim 1, wherein the select circuit includes a multiplexer having input terminals connected to the touch sensors and the display pixels.

6. The touch display controller of claim 1, wherein the analog front-end circuit includes at least one of a sampler, or an integrator.

7. The touch display controller of claim 1, wherein the control circuit adjusts a magnitude of at least one of a feedback resistor or a feedback capacitor, included in the charge amplifier, based on the type of element connected to the analog front-end circuit.

8. The touch display controller of claim 1, wherein the control circuit adjusts a cutoff frequency of the filter based on the type of element connected to the analog front-end circuit.

9. The touch display controller of claim 1, wherein the control circuit adjusts a gain of the variable gain amplifier based on the type of element connected to the analog front-end circuit.

10. A touch display controller comprising:
    a select circuit having a first selectable input terminal for touch sensors, a second selectable input terminal for display pixels, and an output terminal;
    an analog front-end circuit coupled to the output terminal of the select circuit to receive a raw analog signal, and having a shared processing path for analog signals from both the touch sensors and the display pixels;
    an analog-to-digital converter coupled to the shared processing path of the analog front-end circuit and configured to output a digital signal based on a processed analog signal; and
    a processor configured to determine a driving current flowing to a light-emitting element of at least one display pixel based on the digital signal,
    wherein the processor adjusts a magnitude of a reference voltage, input to at least one of the pixels, with reference to the driving current and a previously stored look-up table.

11. A touch display system comprising:
    a cover window including a front surface receiving a touch input;
    a touch sensor panel disposed below the cover window and including touch sensors in which a touch sensing signal is generated in response to the touch input;
    a display panel disposed below the cover window and including pixels;
    a wiring area including touch routing connections connected to the touch sensors and pixel routing connections connected to the pixels, the touch routing connections and the pixel routing connections being disposed on a single layer;

an intermediate insulating layer disposed between the touch sensor panel and the display panel;

vias penetrating through the intermediate insulating layer and connecting the touch sensor and the touch routing connections to each other; and a touch display controller connected to the touch sensor panel and the display panel through the wiring area and configured to determine the touch input and to display an image on the display panel, wherein the touch display controller includes an analog front-end circuit to process a signal output by the touch sensors and the pixels, and the analog front-end circuit is selectably connected to the touch routing connections or the pixel routing connections.

12. The touch display system of claim 11, wherein the touch sensor panel and the display panel are included in a single panel.

13. The touch display system of claim 11, wherein the touch display controller includes a multiplexer having input terminals, connected to the touch routing connections and the pixel routing connections, and an output terminal connected to the analog front-end circuit.

14. The touch display system of claim 11, further comprising:

a fingerprint sensor array including fingerprint sensors in which a fingerprint sensing signal is generated in response to a user's fingerprint input, wherein the fingerprint sensors are selectably connected to the analog front-end circuit.

15. The touch display system of claim 14, wherein the fingerprint sensor array is integrated with at least one of the touch sensor panel or the display panel.

16. A touch display panel comprising:

a select circuit configured to alternately select touch sensors and display pixels included in the touch display panel;

an analog front-end circuit alternately connected to the touch sensors or the pixels by the select circuit, and configured to generate an analog signal using an output signal from the touch sensors or the pixels; and a control circuit configured to set a signal amplification gain of the analog front-end circuit to a first value when the touch sensors are connected to the analog front-end circuit, and to set the signal amplification gain of the analog front-end circuit to a second value, different from the first value, when the pixels are connected to the analog front-end circuit.

17. The touch display panel of claim 16, wherein the analog front-end circuit includes a charge amplifier, a filter, a variable gain amplifier, a sampler, and an integrator as components, and the touch sensors and the pixels share only a portion of the components.

* * * * *